US008890685B1

(12) United States Patent
Sookman et al.

(10) Patent No.: US 8,890,685 B1
(45) Date of Patent: Nov. 18, 2014

(54) EMERGENCY NOTIFICATION USING INDOOR POSITIONING

(71) Applicant: Guardly Corp., Toronto (CA)

(72) Inventors: Josh Sookman, Toronto (CA); Nolan Dubeau, Toronto (CA)

(73) Assignee: Guardly Corporation, Toronto, Ontario ( * ) Notice: Subject to any disclaimer, the term of this patent is extended or adjusted under 35 U.S.C. 154(b) by 0 days.

(21) Appl. No.: 14/182,925

(22) Filed: Feb. 18, 2014

(51) Int. Cl.
*G08B 1/08* (2006.01)
*H04W 4/22* (2009.01)
*G08B 21/02* (2006.01)

(52) U.S. Cl.
CPC *H04W 4/22* (2013.01); *G08B 21/02* (2013.01)
USPC .................................................. 340/539.13

(58) Field of Classification Search
CPC ... A61B 5/0002; G06F 19/3418; G06Q 50/22
USPC .......... 340/5.8, 5.81, 539.11, 539.12, 539.13, 340/539.14, 539.17, 539.16
See application file for complete search history.

(56) References Cited

U.S. PATENT DOCUMENTS

| | | | |
|---|---|---|---|
| 6,295,346 B1 * | 9/2001 | Markowitz et al. | 379/127.01 |
| 6,408,196 B2 * | 6/2002 | Sheynblat et al. | 455/574 |
| 7,206,837 B2 * | 4/2007 | Seligmann | 709/224 |
| 8,284,100 B2 | 10/2012 | Vartanian | |
| 8,395,968 B2 | 3/2013 | Vartanian | |
| 2003/0006280 A1 * | 1/2003 | Seita et al. | 235/380 |
| 2004/0267385 A1 * | 12/2004 | Lingemann | 700/83 |
| 2008/0004904 A1 * | 1/2008 | Tran | 705/2 |
| 2008/0020781 A1 * | 1/2008 | Cho | 455/456.1 |
| 2011/0130112 A1 * | 6/2011 | Saigh et al. | 455/404.1 |

OTHER PUBLICATIONS

Byrne, Richard, "7 Services for Sending Group Texts to Parents and Students," Free Technology for Teachers, Apr. 12, 2012, 3 pages, downloaded from the internet on Jan. 3, 2014, http://www.freetech4teachers.com/2012/04/7-services-for-sending-group-texts-to.html.
"Common Alerting Protocol," Wikipedia, the free encyclopedia, last modified Dec. 31, 2013, 4 pages, downloaded from the internet on Jan. 3, 2014 https://en.wikipedia.org/wiki/Common_Alerting_Protocol.
"Geo-Fence," Wikipedia, the free encyclopedia, last modified Dec. 23, 2013, 2 pages, downloaded from the internet on Jan. 2, 2014 http://en.wikipedia.org/wiki/Geo-fence.

(Continued)

*Primary Examiner* — Jennifer Mehmood
*Assistant Examiner* — Yong Hang Jiang
(74) *Attorney, Agent, or Firm* — Fish & Richardson P.C.

(57) ABSTRACT

Methods, systems, and apparatus, including computer programs encoded on computer storage media, for providing location based assistance using indoor positioning data. One of the methods includes receiving, by a user device, selection of an alert request, the alert request specific to an emergency for a user of the user device, initiating, by the user device, a timer having a predetermined duration, automatically gathering, by the user device, physical indoor location data for the user device, automatically sending, by the user device, a message indicating the alert request to an assistance system upon expiration of the timer, the message comprising the physical indoor location data, and automatically facilitating, by the user device, communication between the user of the user device and the assistance system.

25 Claims, 15 Drawing Sheets

(56) References Cited

OTHER PUBLICATIONS

"Geolocation Software," Wikipedia, the free encyclopedia, last modified Sep. 30, 2013, 5 pages, downloaded from the internet on Jan. 2, 2014 https://en.wikipedia.org/wiki/IP_address_location.

"Location-Based Service," Wikipedia, the free encyclopedia, last modified Jan. 1, 2014, 102 pages, downloaded from the internet on Jan. 2, 2014 https://en.wikipedia.org/wiki/Location-based_service.

"Mobile Phone Tracking," Wikipedia, the free encyclopedia, last modified Jan. 2, 2014, 6 pages, downloaded from the internet on Jan. 2, 2014 http://en.wikipedia.org/wiki/Mobile_phone_tracking.

"Wi-Fi Positioning System," Wikipedia, the free encyclopedia, last modified Nov. 25, 2013, 2 pages, downloaded from the internet on Jan. 2, 2014 http://en.wikipedia.org/wiki/Wi-Fi_positioning_system.

* cited by examiner

EMERGENCY NOTIFICATION USING INDOOR POSITIONING

BACKGROUND

This specification relates to location based services.

Service providers may offer location based services to mobile devices using global positioning system (GPS) data, cellular tower data, magnetometer data, accelerometer data, and Wi-Fi or Bluetooth positioning data. For example, a mobile device may present an approximate physical location of the mobile device in a software application or present information about buildings, emergency medical equipment, emergency personnel and/or other individuals that are physically located near the physical location of the mobile device.

SUMMARY

In general, one innovative aspect of the subject matter described in this specification can be embodied in methods that include the actions of receiving, by a user device, selection of an alert request, the alert request specific to an emergency for a user of the user device, initiating, by the user device, a timer having a predetermined duration, automatically gathering, by the user device, physical indoor location data for the user device, automatically sending, by the user device, a message indicating the alert request to an assistance system upon expiration of the timer, the message including the physical indoor location data, and automatically facilitating, by the user device, communication between the user of the user device and the assistance system. Other embodiments of this aspect include corresponding computer systems, apparatus, and computer programs recorded on one or more computer storage devices, each configured to perform the actions of the methods. A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

The foregoing and other embodiments can each optionally include one or more of the following features, alone or in combination. The physical indoor location data may include two or more time-separated wireless fingerprints. Facilitating, by the user device, communication between the user of the user device and the assistance system may include sending text messages to and receiving text messages from the assistance system. The text messages may be sent and received using an internet protocol. Facilitating, by the user device, communication between the user of the user device and the assistance system may include initiating a real-time audio session between the user device and a device included in the assistance system and operated by an emergency service personnel.

In some implementations, the method includes presenting, by the user device, a countdown user interface depicting the current duration of the timer after selection of the alert request and prior to sending the message indicating the alert request to the assistance system. The method may include presenting, by the user device, a location user interface to allow the user of the user device to input updated physical indoor location data for the user device.

In general, one innovative aspect of the subject matter described in this specification can be embodied in methods that include the actions of receiving, by an assistance system, a message from a user device, the message including an alert request and physical indoor location data for the user device, the alert request specific to an emergency for a user of the user device, determining, by the assistance system, a physical indoor location of the user device using the physical indoor location data, presenting, by the assistance system, an operator user interface to an operator, wherein the operator user interface facilitates communication between the assistance system and the user device and includes a map that includes an identifier representing the physical indoor location of the user device. Other embodiments of this aspect include corresponding computer systems, apparatus, and computer programs recorded on one or more computer storage devices, each configured to perform the actions of the methods. A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

The foregoing and other embodiments can each optionally include one or more of the following features, alone or in combination. The method may include authenticating, by the assistance system, a user account assigned to the user device and corresponding with the user of the user device, determining, by the assistance system and after authenticating the user device, one or more contacts identified in the user account to notify upon occurrence of the alert request, and notifying, by the assistance system, the contacts.

In some implementations, the method includes determining, by the assistance system, hardware components installed in physical locations proximate to the physical indoor location of the user device, presenting, by the assistance system, one or more user interface elements for each of the hardware components, and controlling, by the assistance system, the hardware components upon receipt of a selection of a corresponding user interface element. Presenting, by the assistance system, the user interface elements for each of the hardware components may include presenting the user interface elements in the operator user interface. Presenting, by the assistance system, the user interface elements for each of the hardware components may include presenting the user interface elements on a second user device operated by an emergency personnel. The hardware components may include a door proximate to the physical indoor location of the user device. Presenting, by the assistance system, the user interface elements for each of the hardware components may include presenting, by an access control component, an unlock door option that unlocks the door. The hardware components may include a fire sprinkler proximate to the physical indoor location of the user device. Presenting, by the assistance system, the user interface elements for each of the hardware components may include presenting, by a fire system component, an open valve option that opens the first sprinkler. The hardware components may include a video camera proximate to the physical indoor location of the user device. Presenting, by the assistance system, the user interface elements for each of the hardware components may include receiving, by a video camera component and from the video camera, a video stream of a physical area proximate to the user device, and presenting, by the video camera component, the video stream in the operator user interface.

In some implementations, the method includes notifying, by the assistance system, one or more emergency personnel about the alert request. The method may include providing, by the assistance system, at least one of the one or more emergency personnel with the determined physical indoor location of the user device.

In some implementations, the method includes facilitating, by the assistance system, communication between the assistance system and the user device using the operator user interface. Facilitating, by the assistance system, communication between the assistance system and the user device may include sending text messages to and receiving text messages from the user device. Facilitating, by the assistance system, communication between the assistance system and the user device may include initiating a telephone call between the user device and the assistance system and presenting a user interface for the telephone call in the operator user interface.

In general, one innovative aspect of the subject matter described in this specification can be embodied in methods that include the actions of receiving, by an assistance system, a message from a user device, the message including a request to monitor the user device for a potential emergency situation of a user operating the user device and physical indoor location data for the user device, determining, by the assistance system, a physical indoor location of the user device using the physical indoor location data, determining, by the assistance system, one or more cameras that capture images of an area that includes the physical indoor location of the user device, and presenting, by the assistance system, an operator user interface to an operator, wherein the operator user interface includes an image or a video stream from at least one of the cameras and a map that includes an identifier representing the physical indoor location of the user device. Other embodiments of this aspect include corresponding computer systems, apparatus, and computer programs recorded on one or more computer storage devices, each configured to perform the actions of the methods. A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

The foregoing and other embodiments can each optionally include one or more of the following features, alone or in combination. The method may include receiving, by the assistance system, an alert request, and facilitating, by the assistance system, communication between the assistance system and the user device using the operator user interface. Receiving the alert request may include receiving the alert request from the user device. Receiving the alert request may include receiving input from the operator indicating that the user operating the user device is in an emergency situation. The method may include presenting, in the operator user interface, a list of user devices from which the assistance system has received requests to monitor the corresponding user device.

The subject matter described in this specification can be implemented in particular embodiments so as to realize one or more of the following advantages. In some implementations, a user device may automatically send an assistance request to an assistance system. The user device may send the assistance request to the assistance system upon expiration of a predetermined period of time after receiving user selection of a corresponding alert. In some implementations, a user device may facilitate communication between a user operating the user device and an assistance system. In some implementations, the assistance system may use physical device location information, e.g., indoor and outdoor device location information, to determine how to assist a user, e.g., which assistance personnel is closest to the user's physical location, what instructions to provide the user to reduce potential threats, and/or activate or interact with building hardware to assist the user. In some implementations, the building hardware may include door locks, lighting systems, video cameras, and/or fire prevention (e.g., sprinkler) systems.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

FIG. 5 is an example user interface for creating and sending an alert to a group of users.

FIG. 11 is an example user interface for presenting information corresponding to a received alert request.

Like reference numbers and designations in the various drawings indicate like elements.

DETAILED DESCRIPTION

Figure 1:
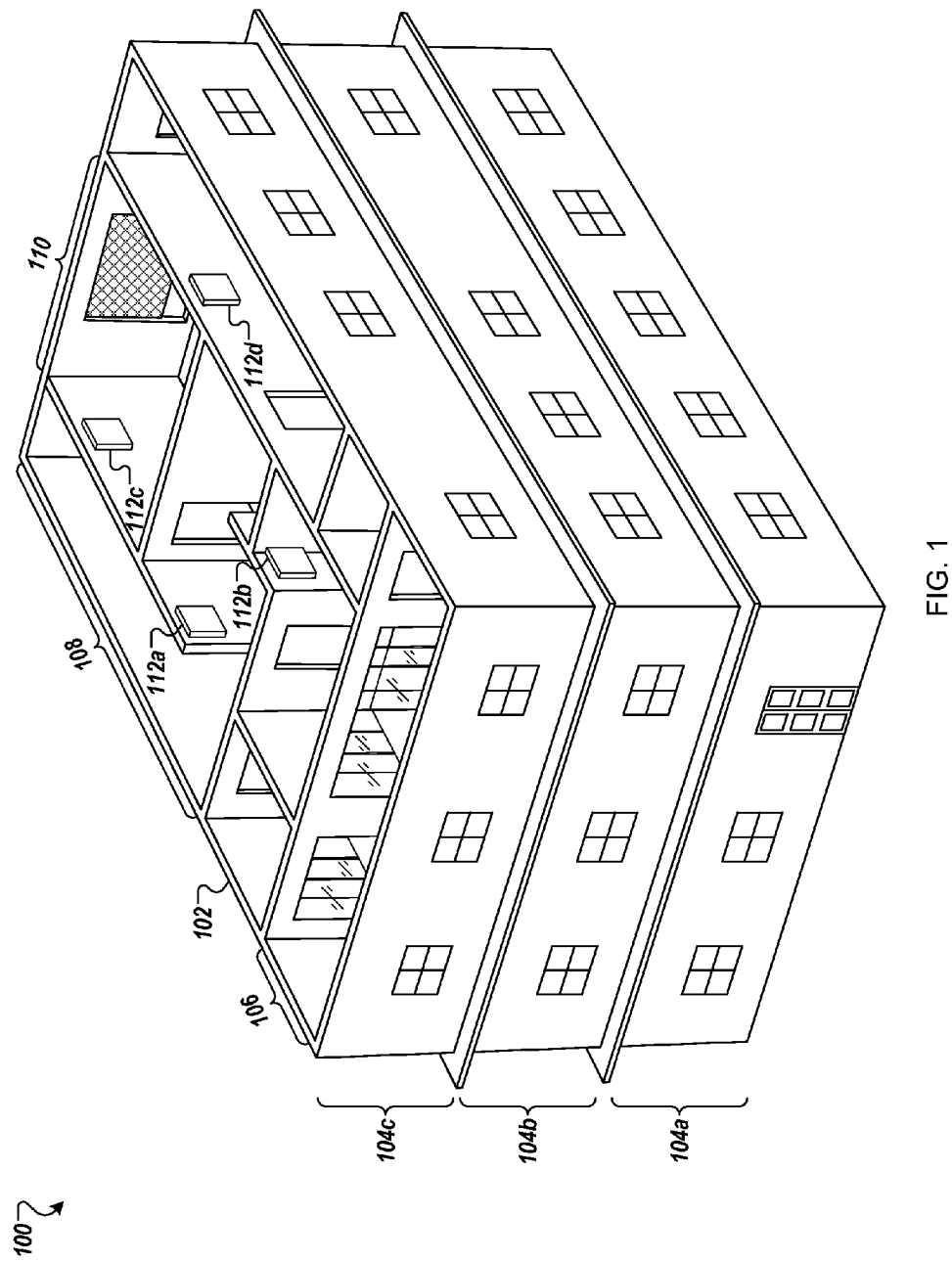
FIG. 1 is an example environment that includes multiple indoor regions in a building.

An emergency service provider can create geofences for outdoor locations and create indoor regions using a map application or separate applications for the geofences and indoor regions. The emergency service provider may send emergency alerts to mobile devices, which are physically located at areas that correspond with a geofence location or an indoor region, to notify the users of the mobile devices about an emergency in their area or when the mobile device enters another area currently in a state of emergency response. For example, the notification may include an indication of a safety issue, e.g., a shooting, in the physical area identified by the geofence or indoor region.

A user may subscribe to a service provided by the emergency service provider to receive emergency alerts from the emergency service provider. When the user receives an emergency alert, the user may request additional information from the service provider, such as recommended safety instructions indicating where the user may go to find safety.

The user may also operate a mobile device to request emergency assistance from the emergency service provider. The assistance may be for help with an allergic reaction when the emergency service provider has access to some of the user's medical history information and/or medical contacts. In this instance, the emergency service provider may coordinate with another person physically located with the user to determine what may have caused the allergic reaction, to determine where the user should go to receive help, and/or who can go to the user's location to help the user. Other types of emergencies may include a physical safety emergency, e.g., when someone is following the user, or when the user is lost or cannot find their vehicle.

An application installed on the user's mobile device facilitates communication between the user, or another person operating the user device, and an operator at the emergency service provider, or another emergency personnel working together with the emergency service provider. The user may communicate with the operator using audio and/or video, a real-time text transmission interface, or a gesture-based interface. When the user requests assistance, the request may indicate a preferred form of communication. For example, a request for help with a peanut allergy may indicate that text-based communications are preferred and a request for assistance with a suspicions person may indicate that audio and/or video communications are preferred, e.g., based on a user preference or setting.

When a user requests assistance from the emergency service provider, the application provides the emergency service provider with data representing the user's location, e.g., GPS, cellular tower data, magnetometer data, accelerometer data, Wi-Fi fingerprint data, and/or Bluetooth fingerprint data, and whether or not the user is moving. The fingerprint data may represent the intensity and signatures of signals received by the user's mobile device from one or more wireless access points and/or beacons in a particular position within a building or structure, from a dataset generated from one or more particular points in time. The emergency service provider may use the location data to identify an indoor or outdoor location associated with the user, and to provide instructions to the user, e.g., when the user is lost, or to identify people in the user's area who may assist the user. For example, when the user is physically located in a building, the emergency service provider may determine the user's physical location using Wi-Fi or Bluetooth fingerprint data, instruct the user where to go, and identify a security guard or another person, e.g., a friend of the user, who can assist the user.

FIG. 1 is an example environment 100 that includes multiple indoor regions in a building 102. An emergency service provider may divide the building 102 into separate floors 104a-c, and each floor into multiple indoor regions based on the layout of the floor. Each region may correspond with a physical room, such as an office 106, a hallway 108, and a conference room 110.

The building 102 may be contained within one or more geofences. For example, the emergency service provider may use a map application to create a geofence that includes only the building 102, a geofence that includes the block in which the building 102 is located, and/or a geofence for the city in which the building 102 is located.

After creating the indoor regions in the building 102, the emergency service provider captures Wi-Fi and/or Bluetooth fingerprint data, e.g., wireless fingerprint data that includes Wi-Fi fingerprint data, Bluetooth fingerprint data, or a combination of the two, at the physical location of the building 102 using an indoor mapping application, e.g., installed on a mobile device. For example, an employee of the emergency service provider or an indoor mapping company goes to the building 102 and captures wireless fingerprint data from multiple Wi-Fi and Bluetooth access points or beacons 112a-d and associates the captured wireless fingerprint data with particular locations and/or the indoor regions within the building 102.

The emergency service provider may apply one or more filters to the captured wireless fingerprint data to remove fingerprint data for one or more particular Wi-Fi and Bluetooth access points or beacons. For example, the emergency service provider may filter the data by the MAC address of the corresponding Wi-Fi or Bluetooth access point or beacon, e.g., to remove any access points, e.g., mobile device "hotspots," that may not always be in the same location, such as cellular telephone access points.

The emergency service provider may use the wireless fingerprint data to determine the location of one or more users in the building 102. For example, when a user requests assistance from the emergency service provider, as described in more detail below, the emergency service provider receives wireless fingerprint data from the user's mobile device and may determine that the user is physically located in the conference room 110 of the building based on the Wi-Fi and Bluetooth signatures assigned to the indoor region for the conference room 110. An operator may then direct the user to the nearest exit, e.g., in the hallway 108, or request that a security guard or first responder go to the user's physical location, e.g., to help the user.

In some implementations, the emergency service provider may send alerts to a group of users located on a specific floor 104a-c in the building 102. For instance, when the building 102 is a hospital, the emergency service provider may send an alert to all users located on the second floor 104b of the building 102 identifying a particular emergency, e.g., a patient in need of assistance, a contamination, or an outbreak. The alert may include procedures specific to the particular emergency, e.g., lockdown procedures. In the case of an outbreak, the emergency service provider may use wireless fingerprint data from the employees of the hospital to determine which employees were located on the second floor 104b when the outbreak occurred, e.g., to notify emergency contacts for those employees.

In some examples, the emergency service provider may send alerts to users in a specific airport terminal or on a specific floor or in a specific building of a school or a university. The alert may include reference to the lockdown procedures relevant to the situation or other details of an emergency.

An emergency service provider may offer services to a community as a whole, e.g., as part of a government program, or to specific businesses. The emergency service provider may gather information from the organization to which the emergency service provider provides emergency services, such as the organization name, geofences or geographical areas in which the organization operates or currently has organization users stationed, specific buildings operated by the organization that will be monitored by the emergency service provider, addresses for these buildings, Wi-Fi and Bluetooth access point identifiers or signatures and associated radio frequency data within these buildings, emergency contacts for the organization, emergency contacts for each organization user, unique identifiers of mobile devices used by organization users, e.g., a device token, and/or specific socket channel(s) being used by organization users on which to receive communications and so on.

The emergency service provider may use the collected data, e.g., the emergency contact data, to determine whom to contact in the case of an emergency. For example, one or more organization employees may be notified when particular types of emergencies occur and other organization employees or non-employees, e.g., a security service, may be notified when different types of emergencies occur. In one example, when the organization is a college or university, the emergency service provider may update a contact database with a central phone number and a corresponding email address for college's or university's campus security.

Figure 2:
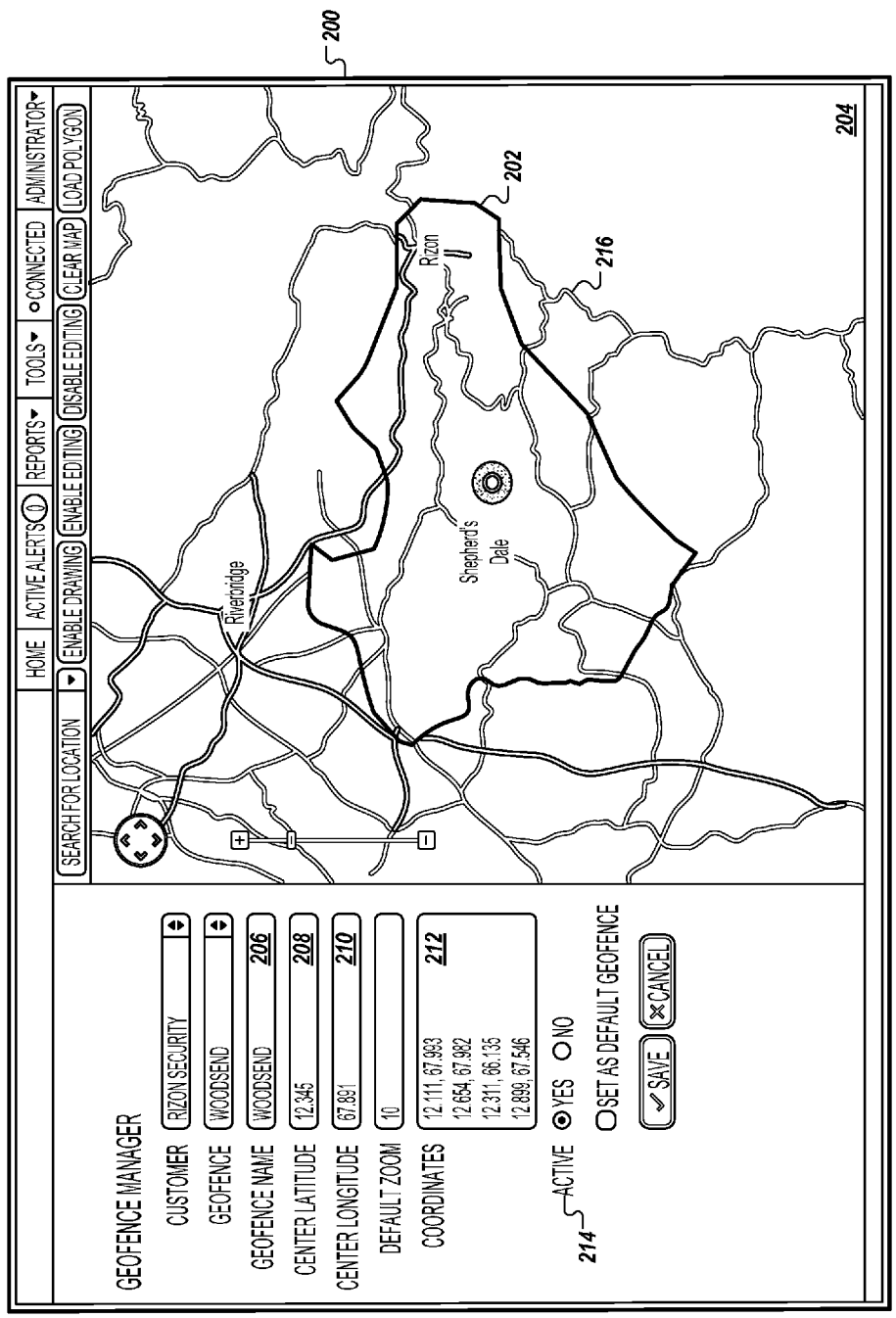
FIG. 2 is an example user interface for creating an outdoor geofence region.

The emergency service provider may also use the collected organization data to create geofence and indoor regions for the organization. FIG. 2 is an example user interface 200 for creating a geofence region 202. The user interface 200 includes a map 204 that allows an administrator to select a predefined region, e.g., a city, county, zip code, or a country, or create any custom-shaped, e.g., polygonal, region for a geofence, e.g., using a drawing tool.

The user interface 200 includes a name field 206 for the geofence region and a center latitude field 208, a center longitude field 210, and a coordinates field 212 that define the geofence region 202. The coordinates field 212 indicates the latitude and longitude coordinates that define the geofence region 202 in the map 204, e.g., for each point in the geofence region 202 there is a corresponding entry in the coordinates field 212. The coordinates field 212 is automatically populated upon creation of the geofence region 202. In some examples, an administrator may enter or update values in the coordinates field 212.

An active selection 214 in the user interface 200 indicates whether the geofence region 202 is active and may be used to send alerts to users. For example, when an administrator creates a number of new geofence regions, e.g., at a particular level of detail, such city geofence regions, each of the regions may be inactive. When the administrator finishes the last geofence region, the administrator may then activate all of the geofence regions, e.g., using the user interface 200 or another user interface that allows activation of multiple geofence regions at the same time.

The map 204 may include one or more features of the geofence region 202. For example, the map 204 may include elevation information or one or more roads 216. The map 204 may also present other geofence regions that were previously defined. A user may refer to the previously defined geofence regions when creating the geofence region 202, for instance to ensure that the geofence regions do not overlap.

In some implementations, a geofence region may include multiple sub-regions. For example, a county geofence region may include multiple city sub-regions and a city geofence region may include multiple building sub-regions. Similarly, each building geofence region may include multiple sub-regions, one for each room in the building and/or one for each floor in the building.

The emergency service provider may use the different levels of regions when providing alerts to users, e.g., based on the type of emergency. For instance, when the emergency service provider determines that a shooting occurred in a particular neighborhood of a city, the emergency service provider may send alerts to all users in the neighborhood. When the emergency service provider determines that there is a possible contamination on a particular floor in a hospital, the emergency service provider may send alerts to all users physically located on the particular floor, e.g., all hospital employees on the particular floor or all users who subscribed to the emergency service.

The user interface 200 may allow an administrator to define indoor regions, such as those described above with reference to FIG. 1. After the administrator defines the indoor regions, the emergency service provider may acquire corresponding wireless fingerprint data that can be used to identify the indoor regions. In some implementations, the emergency service provider may acquire wireless fingerprint data from indoor or outdoor Wi-Fi and Bluetooth networks that are used to identify outdoor regions, e.g., when a device is unable to acquire GPS data, to deliver more accurate location positioning data than GPS data can offer in that location at that time for that particular device, or to supplement GPS data. For instance, a parking ramp may receive GPS data in some areas of the ramp and not in others and the use of wireless fingerprint data in the ramp may allow the emergency service provider to determine the location of a user in the parking ramp.

Each indoor region may be assigned more than one wireless fingerprint, e.g., based on the size of the indoor region. Larger indoor regions, e.g., auditoriums, may have fifteen or more wireless fingerprints while smaller indoor regions, e.g., an office, may have only one wireless fingerprint. In some examples, adjacent rooms may have one or more similar wireless fingerprints or share the same wireless fingerprint or group of wireless fingerprints. For example, two small adjacent rooms or multiple rooms that are close together may be grouped together into a single indoor region because both of the rooms have the same wireless fingerprint. The emergency service provider system may refer to multiple rooms in a single indoor region by their grouping, e.g., rooms 100-102, rather than referring to the rooms individually, e.g., room 100, room 101, and room 102.

The emergency service provider also collects information from end users that may be affiliated with an organization that requested emergency services from the emergency service provider, e.g., such that the end users create user accounts with the emergency service provider. An end user may be employed by the organization, may attend classes at the organization, may be a contractor of the organization, or may not be associated with the organization but may be physically located near a location corresponding to a geofence region created for the organization, e.g., a user who goes to a coffee shop located near or on a college campus or a member of the general public who goes to an airport, stadium, shopping mall or hospital, to name a few examples.

Figure 3:
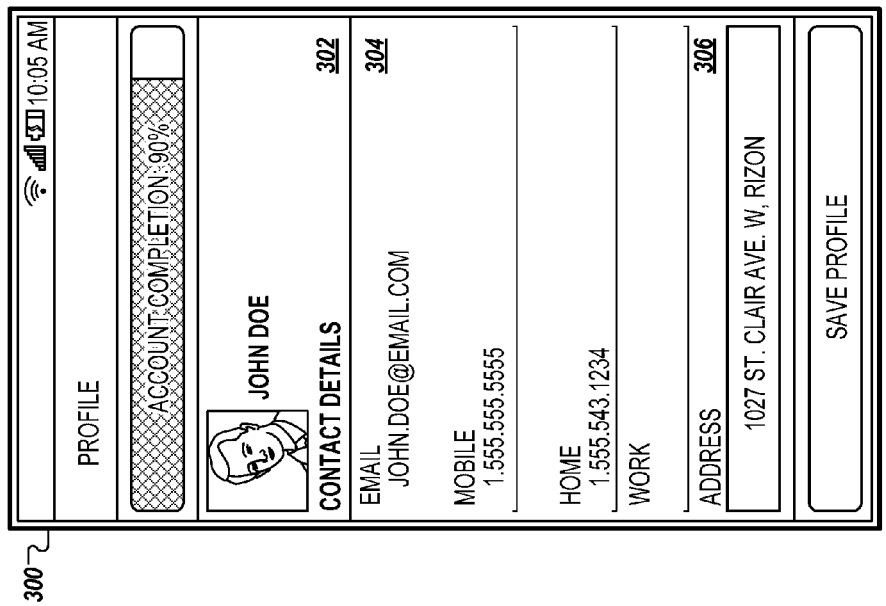
FIG. 3 is an example user interface for collecting profile information from an end user.

FIG. 3 is an example user interface 300 for collecting profile information from an end user. The user interface 300 may include a name field 302, a contact details field 304, a password field, e.g., when creating a user account with the emergency service provider, and fields for additional information about the user, such as the user's medical conditions, physical traits, e.g., eye and hair color, height, weight, etc., and preferences, e.g., whether the users wants to accept push notifications from the emergency service provider or adjust a length of time of a countdown timer.

Figure 4:
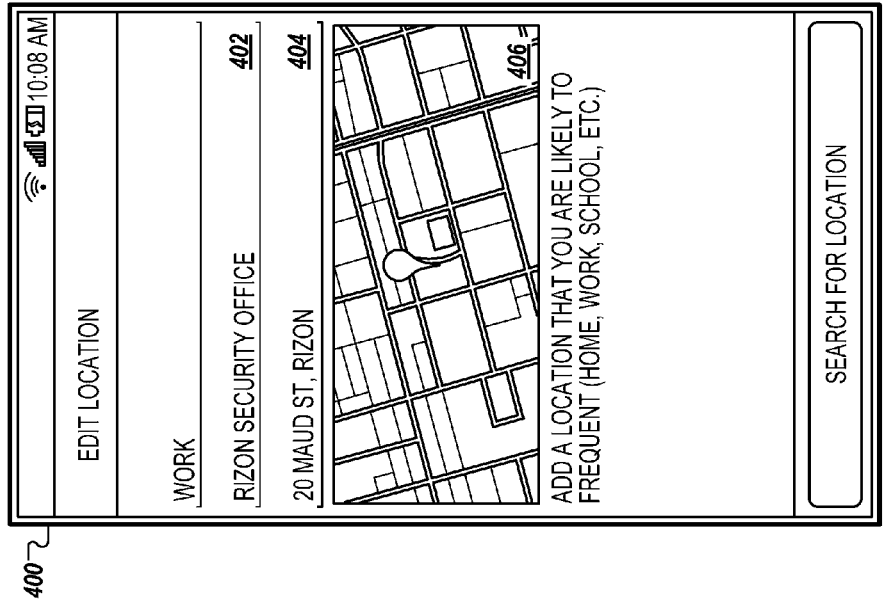
FIG. 4 shows an example user interface for entering an address into a user profile.

The user interface 300 may include one or more address fields 306 for locations the user frequents, such as a home address, a work address, the address of a school the user attends, or the address of a family member. FIG. 4 shows an example user interface 400 for entering a work address 404 into a user profile. The user interface 400 allows the user to enter and search for an address and presents the address in a map 406. The user may create a title 402 for the address, e.g., when the user has multiple work addresses.

Each address may be associated with a time and/or day of the week. For example, when the user attends classes at 7 PM on Wednesday nights, the user may enter 7 PM, Wednesdays, and a specific or approximate time when the class ends, in the user interface 300 or the user interface 400.

The emergency service provider may send the user alerts based on time and day of week information associated with an address in addition to an actual location of the user. For example, when an emergency occurs at the user's school on a Wednesday afternoon, the user may not currently be located near the school but the emergency service provider may send the alert to the user's account indicating the emergency, e.g., so the user can plan accordingly.

The emergency service provider may send the user alerts based on their current location and whether or not the user is located within a geofence and/or indoor region defined by the organization regardless of what locations and associated times may be listed in the user's account profile.

Returning to FIG. 3, the user interface 300, or another user interface used in the user account creation process, may include a field to allow a user to enter contact information for other people. The emergency service provider may use the contact information, e.g., to contact the user's doctor, when an emergency occurs in which the user is involved.

In some implementations, a user can invite their contacts to create accounts with the emergency service provider or create a safety group. When the user is in an emergency, the emergency service provider may send an alert to the contacts in the user's safety group indicating that the user is in trouble and the type of emergency in addition to sending an alert to security or medical personnel depending on the emergency. Sending an alert to the contacts in the user's safety group may allow one of the contacts to help the user prior to the arrival of the security or medical personnel. The emergency service provider may send alerts to the contacts in a safety group even when those contacts do not create an account with the emergency service provider.

The user may create different safety groups for different types of emergencies or different physical locations of the user. A first safety group may include contacts that live close to the user and the emergency service provider may send an alert to these contacts when an emergency occurs and the user is at home. The user may create a second safety group that includes close friends and family and indicate that the emergency service provider should send an alert to the second safety group when the user has an allergic reaction.

The emergency service provider may send alerts to multiple safety groups at the same time. For instance, the emergency service provider may always send alerts to the second safety group mentioned above, e.g., where both the first and second safety groups will receive alerts when an emergency occurs and the user is at home.

After an account for an organization and/or an end user has been created, the emergency service provider may send alerts to end users, e.g., upon identification of an emergency that may affect the end user, or may communicate with an end user during an emergency situation defined by the end user, e.g., when the end user has an allergic reaction or identifies a suspicious person.

Figure 5:
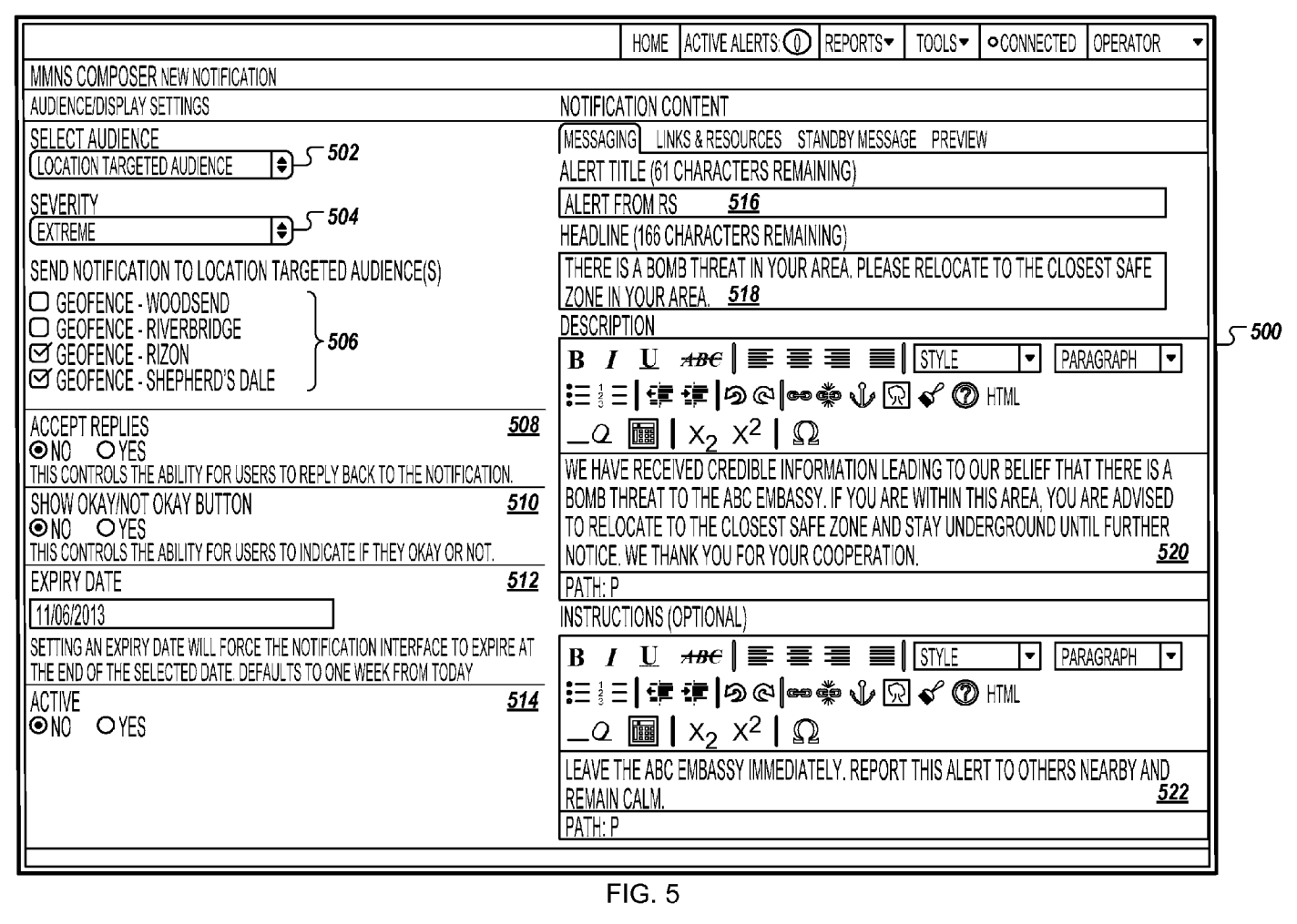

FIG. 5 is an example user interface 500 for creating and sending an alert to a group of users in one or more selected geofence regions, e.g., all users or all users with an account with the emergency service provider. The selected geofence regions may be outdoor regions, a group of indoor regions, e.g., a particular floor of a building, a particular indoor region, or a combination of the three.

The user interface 500 includes a selected audience option 502 that allows an operator to identify a particular subset of users located in the selected geofence regions. For example, the alert may go to everyone, all employees of a particular organization, all security guards, all school employees, or all hospital employees in a selected geofence region. In some implementations, the user interface 500 may receive information indicating that an alert should go to all users or a group of users irrespective of the users' physical locations.

A severity option 504 allows an operator to indicate the severity of the alert. For example, the severity may be extreme, severe, moderate, minor or unknown. The severity may provide an indication to a user of the importance of the alert, e.g., a higher severity would indicate a greater importance. In some implementations, the system may perform different actions based on the severity of the alert.

An operator may use a region selection 506 to select one or more indoor and/or outdoor regions for the alert. When the operator selects a geofence region that includes multiple sub-regions, the user interface 500 may automatically indicate the selection of the sub-regions, e.g., where the selected geofence region may include an arrow or drop down list that, upon selection, presents the sub-regions. The operator may select and/or deselect one or more sub-regions using the sub-region selection controls.

The user interface 500 includes an accept replies option 508 and a status option 510 that allow a user who receives the alert to provide feedback to the emergency service provider as described in more detail below.

An expiry date option 512 receives indication of a time and/or date when the alert will end. When the operator of the user interface 500 accepts the alert information entered into the user interface 500, e.g., upon selection of a send option, the emergency service provider sends an alert to all devices in a physical location corresponding to the selected geofence regions, e.g., when the devices are associated with users who have subscribed to a service provided by the emergency service provider. The emergency service provider will continue to send the alert to any devices that enter the physical area corresponding with the selected geofence regions until the expiry date, at which time the emergency service provider will no longer send the particular alert.

The emergency service provider may have different default expiry dates for different types of emergencies and/or different organizations. For instance, a default duration of a contamination alert may be one week and a default duration for a shooting may be ten hours.

An active option 514 indicates whether an alert corresponding with the information presented in the user interface 500 is active. After an operator changes the active option 514 to "yes" the operator may send the alert to the users or user devices that correspond with the region selection 506, e.g., upon selection of a separate send button in the user interface 500.

An operator may view information about an alert, e.g., in the user interface 500, by viewing a list of non-active alerts, currently active alerts, expired alerts, and/or disabled alerts and selecting one of the presented alerts. For example, an operator may save an alert in a non-active state when the active option 514 is "no," e.g., by selection of a save option, and view the alert again at a later time.

The user interface 500 includes an alert title field 516 and an alert headline 518, e.g., which may be presented on a user's mobile or other device as a summary of the alert prior to the display of a more detailed description, instructions, attached images or videos, or links to other pages or resources on the Internet or an organization's private network or Intranet. A description field 520 accepts input from an operator indicating a description of the emergency, such as an active bomb threat to a particular embassy.

An operator may enter specific emergency instructions into an instructions field 522. The instructions field 522 may be automatically populated with information based on the type of emergency, a particular organization with which the emergency corresponds, e.g., a hospital or a school, and/or the selected geofence regions. For example, when a school includes multiple campuses and one of the campuses is closed because of an emergency, the emergency service provider may send an alert to all users physically located at or near the closed campus, or who are expected to be at the closed campus, indicating that the users should stay at home or go to the other campus that is still open.

Figure 6:
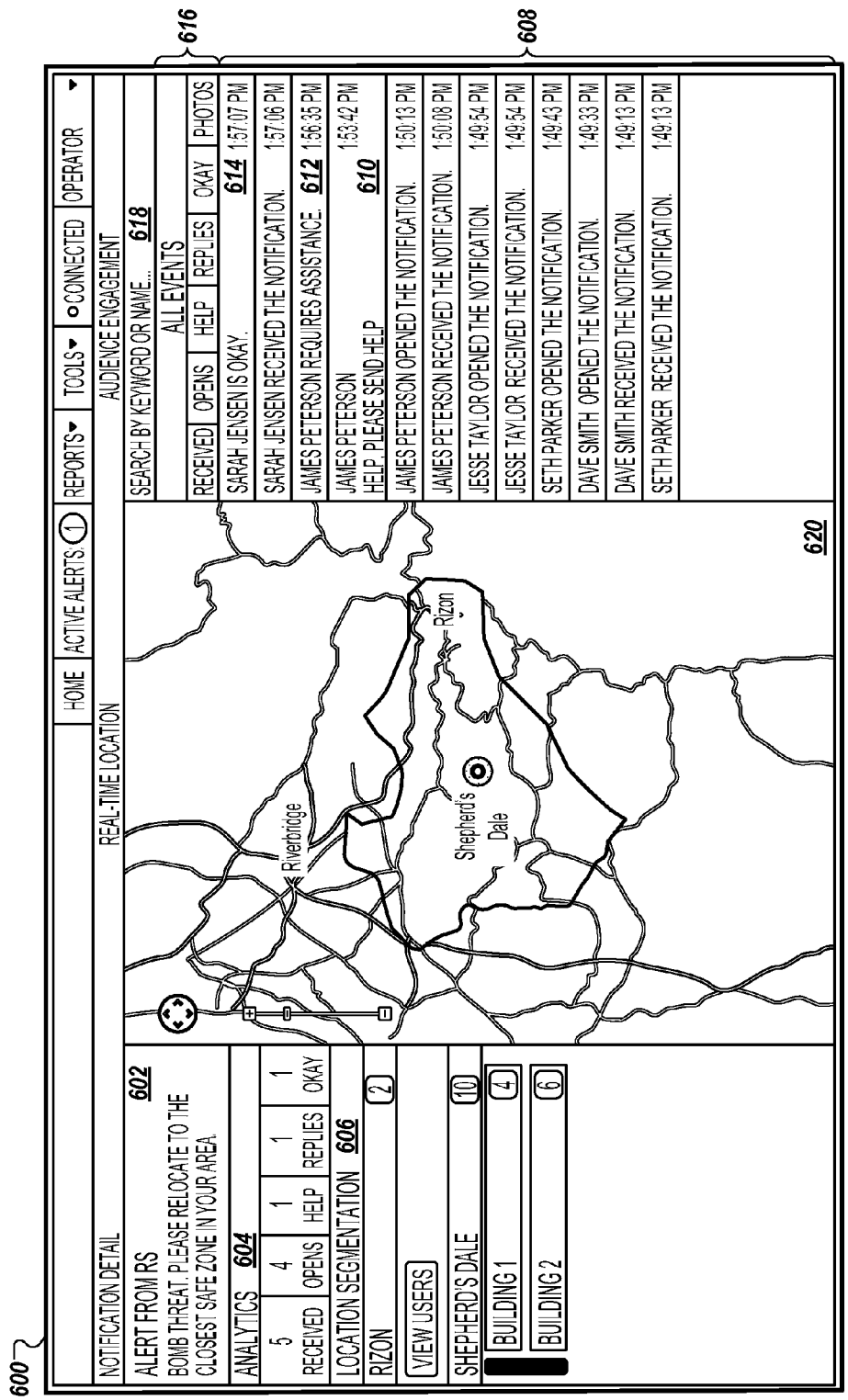
FIG. 6 is an example user interface for presenting status information corresponding to an alert.

FIG. 6 is an example user interface 600 for presenting status information corresponding to an alert. The user interface 600 may be presented to an operator after the operator sends the alert using the user interface 500. The user interface 600 includes a summary 602 of the currently selected alert, such as the title and the headline of the alert.

An analytics section 604 includes information regarding a total number of alerts sent to user devices and the status of the alerts. For example, when a user subscribes to an emergency service offered by the emergency service provider, the user may install an application on their device. When an operator creates an alert and instructs a system to send the alert to users who are physically located in a region corresponding to the selected geofence regions, the system may send the alert to the application installed on the users' devices. The application may communicate with the system, in response to receiving the alert, by providing the system with data indicating whether a user of the device received the alert, opened the alert, requires help or is okay, or replies to the alert with text, videos or other multimedia information.

An event presentation field 608 includes details of the status of the alerts sent to user devices. The event presentation field 608 may identify which users have received the alert, e.g., by indicating that a device operated by a particular user received the alert at a specific time, and whether the users have opened the notification.

Depending on the settings of the alert, e.g., whether a user can reply or indicate whether they are okay as described above, the event presentation field 608 may include additional details regarding the status of a user. A user, e.g., James Peterson, may send a reply to the emergency service provider system which displays content 610 from the reply in the event presentation field 608. The reply may include a request for assistance, e.g., a user generated request stating "Help, please send help," or may include other user generated content.

In some instances the user may reply to an alert and include an image, e.g., a photo, or a video in the reply. The image or video may provide the emergency service provider with information about the user, e.g., the image can be used to determine the location of the user instead of or in addition to wireless fingerprint data, or information about the emergency, e.g., an image of a person involved in the emergency, etc.

When a user is allowed to indicate whether or not they require help, the user interface that presents the alert on the user's device may include an "okay" and a "not okay" button or similar set of options to quickly poll groups of users of their current status or on other matters. Selection of either of the buttons provides the emergency service provider system with the corresponding data. For example, selection of the "not okay" button by James Peterson would send data to the emergency service provider system and may cause the presentation of an assistance request 612 "James Peterson requires assistance" in the event presentation field 608. Selection of the "okay" button by Sarah Jensen could similarly cause the presentation of a no assistance needed status 614 "Sarah Jensen is okay" in the event presentation field 608.

An operator interacting with the user interface 600 may select one or more filters 616 to view a subset of the events. In this example, selection of a help filter would cause the presentation of only the assistance request 612 in the event presentation field 608 and selection of a replies filter would cause the presentation of only the reply content 610 in the event presentation field 608.

A search field 618 allows an operator to search for particular keywords in the event presentation field 608. The operator may use a combination of one of the filters 616 and the search field 618 to view a subset of data in the event presentation field.

The user interface 600 may also include location segmentation data 606 that identifies the particular areas in which the users who receive an alert are physically located. For example, the location segmentation data 606 may indicate that two of the seventeen users who received an alert are physically located in the city of Rizon and that ten of the users are physically located in the city of Shepherd's Dale.

The location segmentation data 606 that identifies the particular areas in which the users who receive an alert are physically located may also show particular buildings in which users are physically located when they receive operator initiated alerts from the emergency service provider. For example, the location segmentation data 606 may include indicators for Building 1 and Building 2 within the city of Shepherd's Dale that identify four users and six users respectively.

In some examples, the indicators may identify a quantity of outstanding active requests for help. For example, Building 1 may have four active requests for help and Building 2 may have six active requests for help. The emergency service provider system may locate the users in Building 1 and Building 2 using indoor positioning to determine the physical locations of those users.

In some implementations a map 620 in the user interface 600 may present information corresponding to the alert. The map 620 may identify the geofence region corresponding to the alert and/or metrics corresponding to the physical locations of the users who received the alert, e.g., a heatmap showing the density of the user locations.

The map 620 may be used to determine whether the users who received the alert are still in the selected geofence region corresponding to the alert, e.g., by presenting updated information showing the new physical locations of the users as the users respond to the alert.

In some implementations, the emergency service provider system may send an alert to all user devices associated with the system, e.g., all devices that correspond with a user account with the system, and each user device determines whether or not to present the alert. For example, the alert may include geofence region information and the user device determines whether the user device is physically located in an area that corresponds with the geofence region and, if so, presents the alert or, if not, discards the alert. The emergency service provider data model for alerts may adhere to the Common Alerting Protocol (CAP) format. Alert data in CAP format can be imported from third-party systems and sent through the emergency service provider system. In some examples, alerts from the emergency service provider system can be transmitted or exported in CAP format for dissemination from third-party systems.

The emergency service provider system may provide the alert to only a subset of users, e.g., by determining the physical locations of all the users in the system and sending the alert only to those users who are physically located in an area corresponding with a geofence region of the alert. In some example, the emergency service provider system may provide the alert to user devices physically located in an area corresponding with a selected geofence region and to all users whose current locations are unknown, e.g., and the devices of those users may determine whether or not to present the alert to the user.

When a user device has current location data, e.g., GPS or cellular tower data, the user device provides the current location data to the emergency service provider system. If the user device has not received updated location data recently, the user device may provide the emergency service provider system with the most recent location data. The user device may provide the most recent location data only if the most recent location data was received within a predetermined threshold period of time.

When a user device does not have current location data, e.g., as determined from GPS or cellular towers, or the current location data is not sufficiently detailed, e.g., when the location is specific to a city but not a part of the city, the user device may communicate with the emergency service provider system to determine a current location for the user device. For example, the user device may send the emergency service provider system a current wireless fingerprint for the user device and the emergency service provider may determine the current location of the user device using the current wireless fingerprint and send the alert, or not, based on the current location of the user device.

In some implementations, the user device may have a local database of wireless fingerprints, e.g., for areas commonly accessed by the user device, and may use the local database to determine a current location of the user device. If the user device has a current wireless fingerprint that is not included in the local database, the user device may communicate with the emergency service provider system to determine the current location of the user device.

Figure 7:
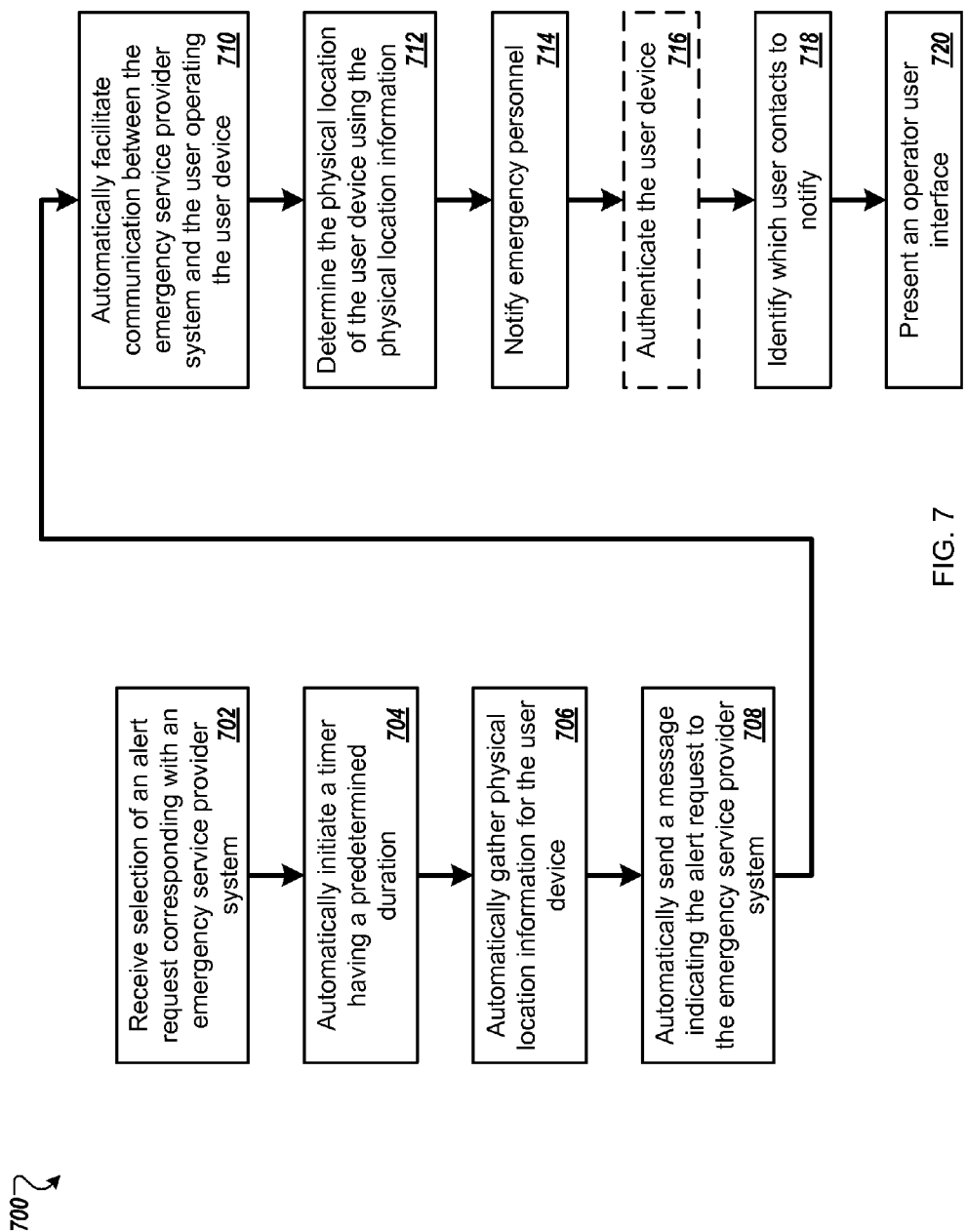
FIG. 7 is a flow diagram of a process for facilitating assistance communication with an end user.

FIG. 7 is a flow diagram of a process 700 for facilitating assistance communication with an end user. For example, the process 700 can be used by a user device operated by an end user and an emergency service provider system.

Figure 8:
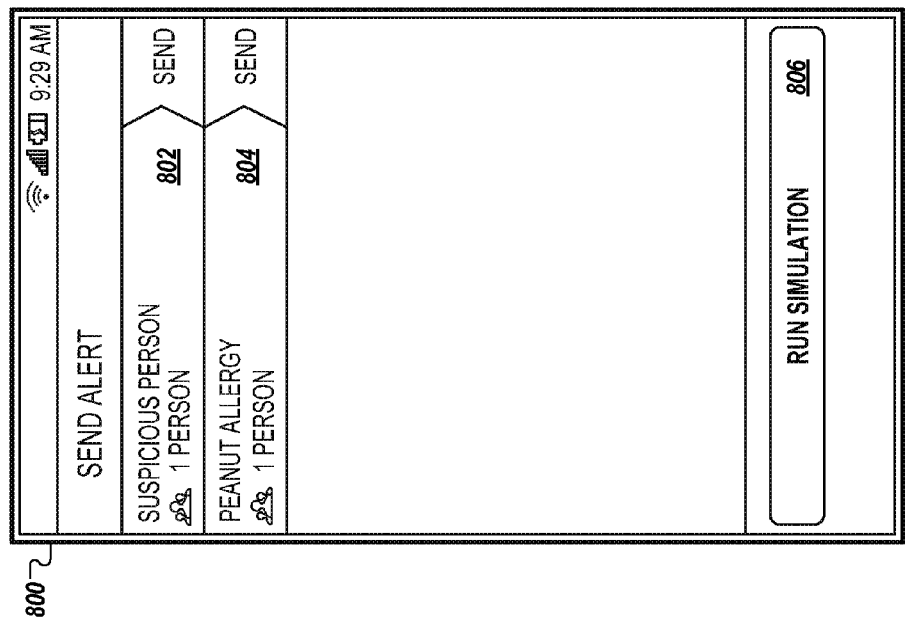
FIG. 8 is an example user interface for sending an alert to an emergency service provider system.

A user device receives selection of an alert request corresponding with an emergency service provider system (702). FIG. 8 is an example user interface 800 for sending an alert to an emergency service provider system. A user device may launch the application upon receipt of selection of the application from the end user and present the user interface 800. The user device may then receive selection of a suspicious person alert 802 or an allergy alert 804 from the user. The specific alerts included in the user interface 800 may be specific to the user, e.g., customized by the user as in the case of a medical condition, and/or may include one or more default alerts, e.g., the suspicious person alert 802.

Figure 9:
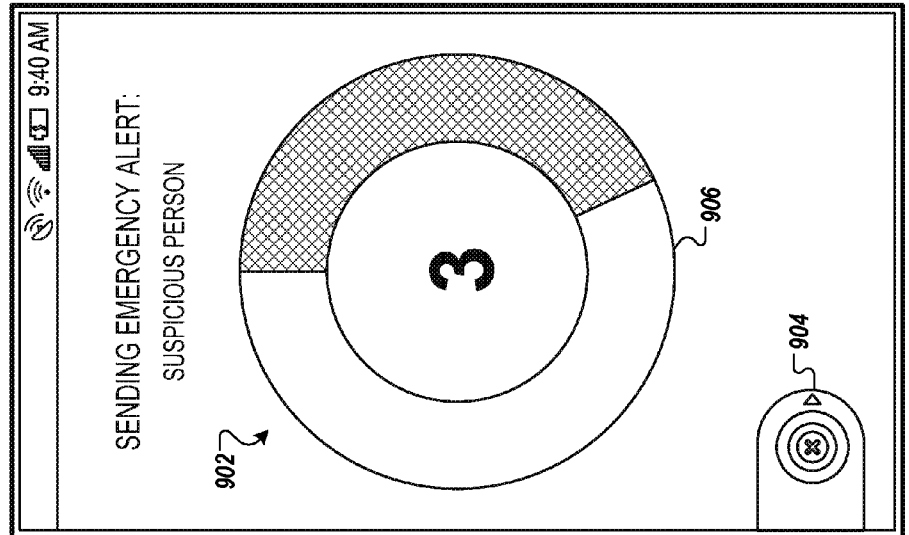
FIG. 9 is an example countdown user interface.

In some implementations, the user interface 800 includes a simulation button 806. Upon receiving selection of the simulation button 806, the user device may present a sequence of user interfaces showing the user what to expect during an emergency, e.g., the user interfaces shown in FIGS. 9-10 described below.

The user device automatically initiates a timer having a predetermined duration (704). When the user device determines that the user selected the suspicious person alert 802, or the allergy alert 804, the user device presents a countdown user interface 900, shown in FIG. 9, which includes a timer 902 and a cancel option 904. As the timer progresses, a timer bar 906 may fill up until the time expires and the timer bar is completely full.

The duration of the timer 902 may be based on the type of alert. For example, an allergy alert timer may have a longer duration than a suspicious person alert timer. A timer may be as short as 3 seconds, or as long as several hours. In some examples, the timer may be between about 5 seconds to about 10 seconds long. Once the user device receives selection of one of the alerts and begins the timer process, the user device requires no additional input from the user to send a message indicating the alert request to the emergency service provider system. In some implementations, the timer 902 may be accelerated or triggered immediately by the user device upon receipt of input from a user, e.g., a touch input, a swipe gesture, or an accelerometer-invoking movement of the user device.

User selection of the cancel option 904 causes the user device to present the user interface 800 on a display. The user may then select a different alert, for example when the user initially selected the wrong alert. In some implementations, the user device may receive selection of a different alert after the timer expires and the user device sends a message indicating the alert request, as described below.

Returning to FIG. 7, the user device automatically gathers physical location information for the user device (706). For example, the user device may identify GPS data, cellular tower data, e.g., triangulation data, or wireless fingerprint data while the timer counts down. This gathered data may be transmitted to the emergency service provider system so that the user device may be tracked, e.g., based on user permissions, for the duration of the timer 902 by security and/or emergency personnel.

The user device may capture location information every five to ten seconds or some other period of time manually configured by an operator and provide location information to the emergency service provider system as necessary, e.g., upon facilitating communication between the user device and the emergency service provider system. The user device may continue to provide the location information continuously during the emergency situation.

The user device does not provide location information to the emergency service provider system when there is not an active emergency situation identified by the user device, e.g., as determined by selection of the suspicious person alert 802 or the allergy alert 804, or upon receipt of an emergency alert as described above with reference to FIGS. 5-6.

The user device automatically sends a message indicating the alert request to the emergency service provider system (708). After the timer expires, the user device sends a message to the emergency service provider indicating the type of assistance required by the user. The message may include location data corresponding to the physical location of the user device.

The location data may be GPS data, cellular tower data, Wi-Fi or Bluetooth access point data that have been geocoded into GPS coordinates, or wireless fingerprint data and may identify a particular location of the user device or may be used by the emergency service provider to determine the particular location of the user device. The user device may provide the location data to the emergency service provider system throughout the emergency, e.g., every five to ten seconds when the user device captures updated location data or when the user device detects movement of the user and the user device.

Each time the user device provides the emergency service provider system with location data, the location data may include multiple individual snapshots of location information. For example, the user device may provide the emergency service provider system with two, three, or more time-separated wireless fingerprints or three GPS snapshots. The emergency service provider system may use the multiple individual snapshots of location information to verify the physical location of the user device, e.g., in case one of the snapshots is incorrect.

The message may include credential information associated with the user. For example, the credential information may include an account name, password information, and/or the user's name.

After the timer expires, the user device automatically facilitates communication between the emergency service provider system and the user operating the user device (710). The communication may be over an audio or video connection between a system operator and the user, e.g., a real-time audio or video session. The communication may include additional parties, e.g., a conference call using analog or digital telephone services, Voice over IP (VoIP), Session Initiation Protocol (SIP), Web Real-Time Communications (WebRTC) or other protocols for audio and/or video communication.

Figure 10:
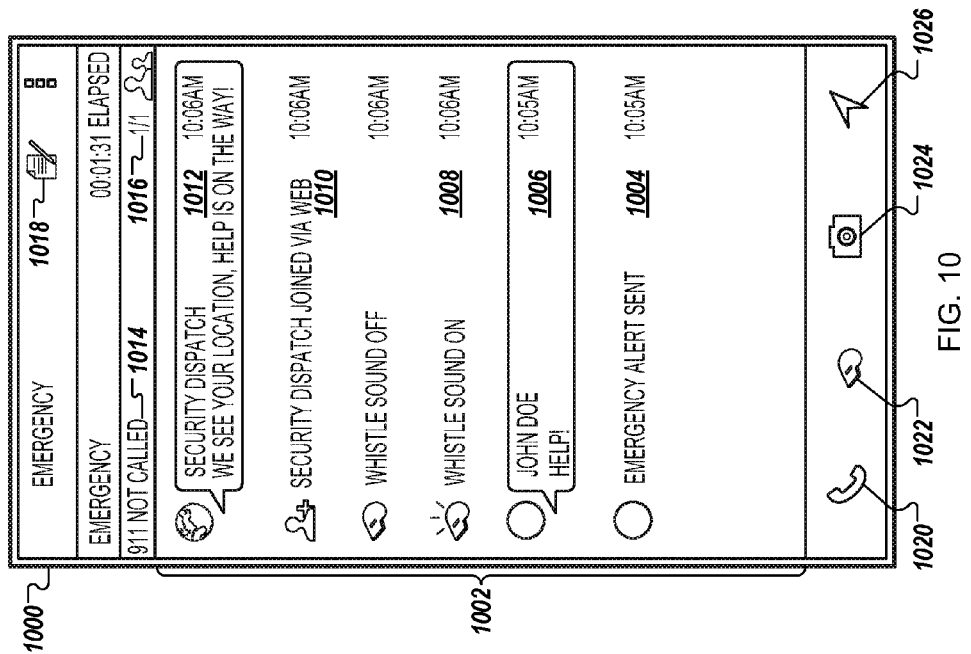
FIG. 10 is an example user interface for presenting communications between the user and the emergency service provider.

FIG. 10 is an example user interface 1000 for presenting communications between the user and the emergency service provider, e.g., an operator employed by the emergency service provider. The user interface 1000 includes an event list 1002 that indicates actions performed in response to the alert request, such as an alert sent event 1004.

The user of the user device may send additional information to the emergency service provider system, such as a message for "Help!" or other information about the alert request, as indicated by a request event 1006. The user interface 1000 includes a compose message option 1018 that allows a user to enter a message and send the message to the emergency service provider system.

Depending on the type of emergency, the user interface 1000 may include a whistle option 1022 that actives an audible alert. When the user device receives selection of the whistle option 1022 while the whistle is off, the user interface 1000 may present a whistle on event 1008, alter volume settings on the device (e.g., increase the volume), and/or play an audible whistle sound through the speaker system of the device. When the user device receives selection of the whistle option 1022 while the whistle is on, the user interface 1000 may present a whistle off event in the event list 1002, alter volume settings on the device (e.g., decrease the volume), and turn off an audible whistle sound playing through the speaker system of the device.

Figure 11:
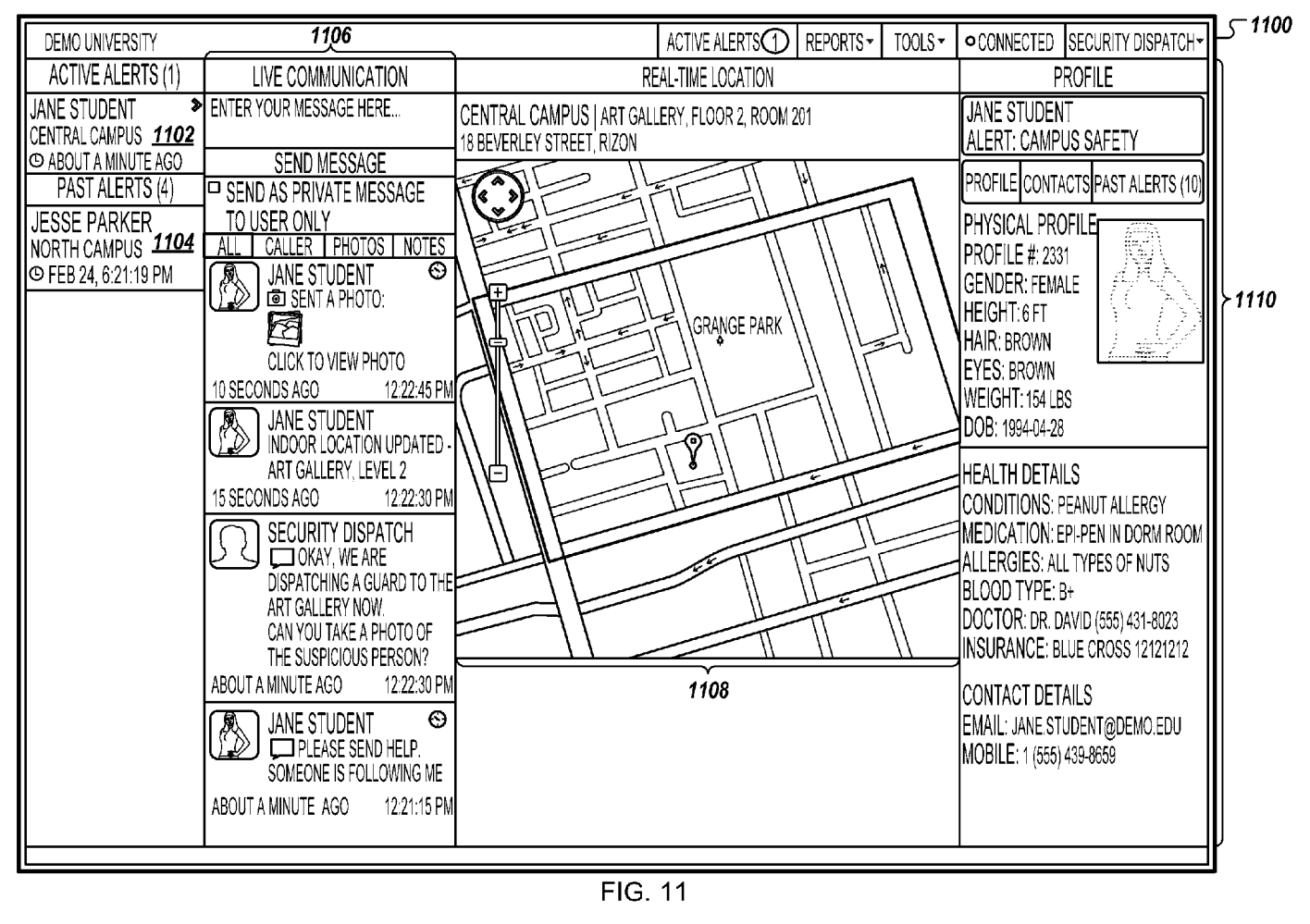

Once a security dispatch operator joins the communication between the user device and the emergency service provider system, e.g., upon presentation of the user interface 1100 to the security dispatch operator described below with reference to FIG. 11, the event list 1002 may present a dispatch join event 1010 in the event list. The event list 1002 may allow the dispatch operator to communicate with the user via text interface, by presenting a reply event 1012 "We see your location, help is on the way!" The user device may use socket services, publish-subscribe services, instant messaging services, webchat services, short message services, audio services, video services, or any other appropriate service or protocol to communicate with the emergency service provider system.

The user and the dispatch operator may continue to communicate using the event list 1002, or another text messaging program, until the emergency is resolved. The user may select a phone call option 1020 to call the dispatch operator or another emergency personnel. For instance, upon receipt of selection of the phone call option 1020, the user device may call a government emergency service, e.g., city, state, or federal. The user may change one or more settings that indicate that selection of the phone call option 1020 should call the dispatch operator, a local police service, another emergency service, or a combination of the three.

Upon contact of a government emergency service, by the user device or the emergency service provider system, an emergency service status icon 1014 changes from "911 not called" to "911 call in progress" or "911 contacted," or other information corresponding to the specific government emergency service contacted.

The user interface 1000 may include a participants status icon 1016 that shows the total number of emergency personnel participants on the communication, e.g., the dispatch operator, another emergency personnel, etc. The total number of participants may include participants involved in the emergency in any type of communication form. For example, if the dispatch operator sends a security guard to the user's physical location, the participants status icon 1016 may present "2/2" to indicate that the dispatch operator and the security guard are involved in the emergency or may show "1/2" to indicate that one of the two emergency personnel are directly involved in communications with the user while the other emergency personnel is working on the emergency but is not currently in direct communication with the user.

The user interface 1000 may include a photo or video option 1024 that allows the user to take a photograph or record a video, or select a previously taken photograph or video, and send the photograph or video to the emergency service provider system. The emergency service provider system may use the photograph or video to identify the location of the user device or a person involved in the emergency.

Upon receipt of selection of a map location option 1026, the user device may present a map to the user indicating the user's position. The user may indicate that the indicated position is correct or incorrect and, if the location is incorrect, the user device may receive updated location information from the user and send updated location data to the emergency service provider system.

Returning to FIG. 7, the emergency service provider system determines the physical location of the user device (712). For example, the emergency service provider system may use multiple, e.g., two or more wireless fingerprints from the user device to determine the physical location of the user device as described in more detail above. The user device determines the multiple wireless fingerprints at different times and, in some instances, at different locations, e.g., as the user carrying the user device moves.

The emergency service provider system compares the received wireless fingerprints to a database of fingerprints to determine the closest matches in the database. The emergency service provider system may use any appropriate algorithm to determine the physical location of the user device with the received wireless fingerprints.

The emergency service provider system may use the last know GPS location data received from the user device, e.g., when the user device is located outdoors or to cross reference the last known GPS location data with a location determined from wireless fingerprint data to determine if there are discrepancies between the two locations.

The emergency service provider system notifies emergency personnel (714). For instance, the emergency service provider system may determine whether the user device is physically located within an area corresponding to an organization's geofence region, e.g., the organization that employs the user, or is physically located outside that area. The emergency service provider system then determines which emergency personnel or third-party systems to notify based on the user device's location, e.g., the organization's security company when the user device is located in an area corresponding to the organization's geofence region or local police if the user device is outside of that area.

The emergency service provider system may provide the emergency personnel, e.g., the security or police service, with the location of the user, e.g., as part of the notification or separately, e.g., over the telephone or via email. The location information may indicate an outdoor location or an indoor location of the user. For example, the location information may indicate that the user is in a specific building at a school campus or a particular room in the specific building.

In some implementations, when the user device contacts emergency personnel directly, e.g., without contacting the emergency service provider system, the emergency personnel may request location information from the emergency service provider system. For example, the emergency service provider system may create an application programming interface (API) that allows a system operated by the emergency personnel to request the physical location information of the user device from the emergency service provider system.

Upon receiving a location request from the emergency personnel system, the emergency service provider system may provide location information, e.g., received from the user device or determined from data received from the user device, to the emergency personnel system.

In these implementations, the emergency service provider system may also send data about the user to the emergency personnel system, such as safety contacts of the user, or medical information for the user.

The emergency service provider system may authenticate the user device (716), e.g., to determine the user account for the user and information about the user, such as the safety contacts and medical history of the user.

The emergency service provider system identifies which user contacts to notify (718). For example, the emergency service provider system may use the determined user account, the physical location information of the user device, and the type of emergency to determine which contacts to notify, in addition to the emergency personnel, and how to notify those contacts. The emergency service provider system may also proceed with notifying the contacts about the alert request.

The emergency service provider system presents an operator user interface (720). FIG. 11 is an example user interface 1100 for presenting information corresponding to a received alert request. Upon receipt of the alert request from the user device, the emergency service provider system, which includes one or more computers, may present the user interface 1100 to a dispatch operator. The dispatch operator may be employed by the emergency service provider, campus security, business security, or a government agency, to name a few examples. The emergency service provider system may present the user interface 1100 on a mobile device, e.g., in a squad car, on a mobile phone, on a desktop or laptop computer, or on a tablet.

The user interface 1100 includes an active alert selection 1102 that includes the name of the user, the physical location of the user, and the time of the last response from the user. The dispatch operator may also view information about past alerts by selecting a past alerts selection 1104. The past alerts selection 1104 may allow the dispatch operator to view information about related alerts, e.g., for the same organization, the same geofence region, or that occurred in a similar physical geographical area.

A user profile 1110 presents information about the user with which the dispatch operator is communicating. For example, the user profile includes the user's medical history, such as their allergies and medications. The dispatch operator, or the emergency service provider system, may use the user profile to determine what action to take based on the current user emergency, such as what doctor to call when the user is having an allergic reaction.

A live communication field 1106 allows the dispatch operator to send and view text messages from the user. For example, the live communication field 1106 may present the user's initial request for help: "Please send help. Someone is following me." In this example, the dispatch operator replied to the request for help indicating that a guard has been dispatched to the user's location and requesting a photograph of the suspicious person.

The user interface 1100 includes a map 1108 of the user's current physical location. In some implementations, when the user is at an indoor location, the map 1108 may include a detailed view of the building, such as a floor plan, in which the user is physically located, e.g., similar to the environment 100 shown in FIG. 1.

In some implementations, the map 1108 may include multiple icons for the user's location. For example, when the emergency service provider system receives both GPS and wireless fingerprint data that represent different physical locations for the user device, the map 1108 may present both locations. The dispatch operator may then ask the user which physical location is correct and update the map 1108 accordingly. In some examples, the user may indicate their actual location on their user device, e.g., using a user interface similar to the user interface 400 shown in FIG. 4 or by selecting the map location option 1026 described with reference to FIG. 10.

In these implementations, the map 1108 may include indicators that represent the confidence level of the corresponding location information. For example, a green icon may represent a high level of confidence by the emergency service provider system that the user device is physically located at the indicated position, a yellow icon may represent a medium level of confidence, and a red icon may represent a low level of confidence.

The user interface 1100 may include a phone call option that, upon selection, creates a telephone call, e.g., a voice over internet protocol (VoIP) call, with the user. The phone call option may be presented depending on the type of emergency, e.g., when a user has an allergic reaction but not when the user is being followed.

Returning to FIG. 7, the order of steps in the process 700 described above is illustrative only, and facilitating assistance communication with the end user can be performed in different orders. For example, the emergency service provider system may present the operator user interface prior to the facilitation of communication between the user device and the emergency service provider system. In this example, the user interface 1100 would include general information without detailed information corresponding with the user device until the user device sends the message indicating the alert request to the emergency service provider system.

The emergency service provider system may authenticate the user device, e.g., perform step 716, prior to the selection of the alert request on the user device, e.g., step 702. The emergency service provider system may identify which user contacts to notify, e.g., perform step 718, before receiving the message indicating the alert request from the user device, e.g., step 708. The emergency service provider system may present the operator user interface, e.g., perform step 720, in response to receipt of the message indicating the alert request from the user device, e.g., step 708, and prior to the facilitation of communication between the emergency service provider system and the user device, e.g., step 710.

In some implementations, the process 700 can include additional steps, fewer steps, or some of the steps can be divided into multiple steps. For example, the emergency service provider system may determine the physical location of the user device, present the operator user interface, identify which user contacts to notify, and notify emergency personnel, e.g., in this order or another order.

The user device may allow the user to launch the emergency service application, e.g., installed on the user device, from a lock screen. For instance, the lock screen may allow the user to make an emergency call and launch the emergency service application. A physical button on the user device, or on another hardware device, may provide a shortcut that, upon selection, launches the emergency service application on and sends an alert from the user device. When the physical button is located on another hardware device, the other hardware device sends a message or a signal to the user device to launch the emergency service application and trigger an alert.

The user device may be any type of device that can send and receive data over a network and communicate with the emergency service provider system. In some implementations, the user device includes voice communication or gesture functionality. Some examples of user devices include mobile telephones, tablets, and laptops.

The emergency service provider system may determine hardware components installed in physical locations proximate to the physical indoor location of the user device. For example, the emergency service provider system may identify one or more doors, one or more fire sprinklers, and one or more video cameras that are proximate the physical indoor location of the user device and present a user interface element for each of the hardware components in a user interface to allow an operator or an emergency personnel to control the hardware components to assist the user operating the user device. For instance, the operator user interface or another user interface, e.g., presented on a user device operated by the emergency personnel, may include the user interface elements.

The emergency service provider system may include an access control component, a fire system component, and a video camera component that may control corresponding hardware. For example, the access control component may control the doors, the fire system component may control the fire sprinklers, and the video camera component may control the video cameras of a physical location, e.g., near the physical location of the user device.

The emergency service provider system may be implemented in one or more computers. For instance, the emergency service provider system may be implemented on computers operated on behalf of the emergency service provider, on computers operated on behalf of an organization that receives services from the emergency service provider, on computers operated on behalf of an indoor mapping company, on other computers, or on computers operated on behalf of a combination of different entities including the entities mentioned above. For example, a system of an entity that includes access control capabilities, e.g., doors, may operate the access control component while a separate system operates other components of the emergency service provider system.

The emergency service provider system may allow an operator to control the hardware components upon receipt of a selection of a corresponding user interface element. The user interface elements may include an unlock door option that unlocks a corresponding door, an open valve option that opens a corresponding first sprinkler, and a video camera element that allows an operator to control the movement of a corresponding video camera. The emergency service provider system may automatically determine and/or help an operator select the most appropriate video camera located in a physical area proximate to the user and the user device and present the video stream in the operator user interface.

The hardware components may be located in the same building as the user device. The hardware components may be located in buildings adjacent to the building in which the user device is located, e.g., where a video camera on a first building can capture content that includes a second building in which the user device is located. In some examples, the hardware components are on the same floor in a building as the user device or in an adjacent floor.

When the hardware components include a door, the emergency service provider system may determine that the door could be physically located on a path from the current physical location of the user device to a building exit or an exit to a different section of the building. For example, when the user device sends a suspicious person alert, an operator may unlock a door to allow the user of the user device to pass through the door, and then lock the door after the user passes through the door, e.g., to prevent the suspicious person from using the same door.

The operator may use a video camera to receive images of the user operating the user device and other people in an area proximate the user. For example, the operator may view a video stream that includes images of the user and a suspicious person or another person near the user. The operator may use the video stream to identify a status of the user or information about an emergency situation in which the user is involved.

When the emergency situation involves a fire, the operator may activate one or more fire sprinklers. In some examples, the operator may activate a first sprinkler to deter a suspicious person.

In some implementations, the emergency service provider system may receive an indication that an alert timer has been activated on a user device, e.g., as a request to monitor the user device, without receiving an alert request from the user device. The emergency service provider system may then use wireless fingerprint data, GPS data, or other location information from the user device to select and prioritize specific cameras, proximate to the user and user device, that include images and/or live video streams of a user operating the user device and present the images and/or the live video streams to an operator of the emergency service provider system. For example, the emergency service provider system may receive location information from the user device upon activation of the timer, identify one or more cameras that are capturing images of a physical area in which the user device is located, and present the video streams from those cameras to an operator or another emergency service personnel. The operator may then monitor the status of the user and activate an alert if necessary.

For instance, a user may initiate a timer upon entering a parking lot or a parking garage. Once the timer is initiated, the user's user device may send location information to the emergency service provider system. The emergency service provider system uses the location information to determine a physical location of the user device and hardware components in a physical area proximate the physical location of the user device. Upon identification of a camera, the emergency service provider system may present a video stream from the camera in an operator user interface to allow an operator viewing the operator user interface to monitor the status of the user as the user walks to their car.

In some implementations, when the user and the user device move from a first location to a second location, the user device sends a location update that includes wireless fingerprint data. The emergency service provider system may interpret this updated location information, automatically determine that a new camera should be selected to continue to monitor the user and the user device, and display the video feed associated with the updated location information from the user device.

The timer may be selectable to provide the user with enough time to walk to their car. In some implementations, the user may be able to pause the timer, e.g., to provide the user time to walk to their car, while the user device continues to provide location information to the emergency service provider system and/or the emergency service provider system receives a video stream from a camera monitoring a physical area proximate to the user.

In some implementations, the emergency service provider system may present a user interface that includes a list user devices, or corresponding user account information, that have initiated timers but not yet provider the emergency service provider system with alert requests. An operator of the emergency service provider system may interact with the user interface to select a particular user account, view information about a user that operates the user account, or select a camera to view a physical area proximate to or including the physical area in which the user device is located, as described above.

Figure 13:
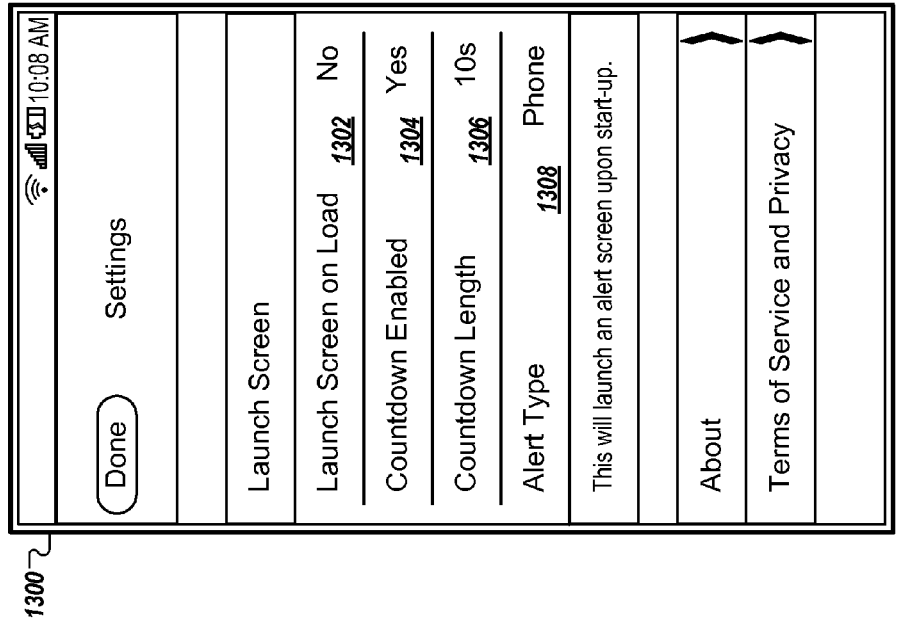
FIGS. 12-13 are example user interfaces for entering profile information for an end user account.
Figure 12:
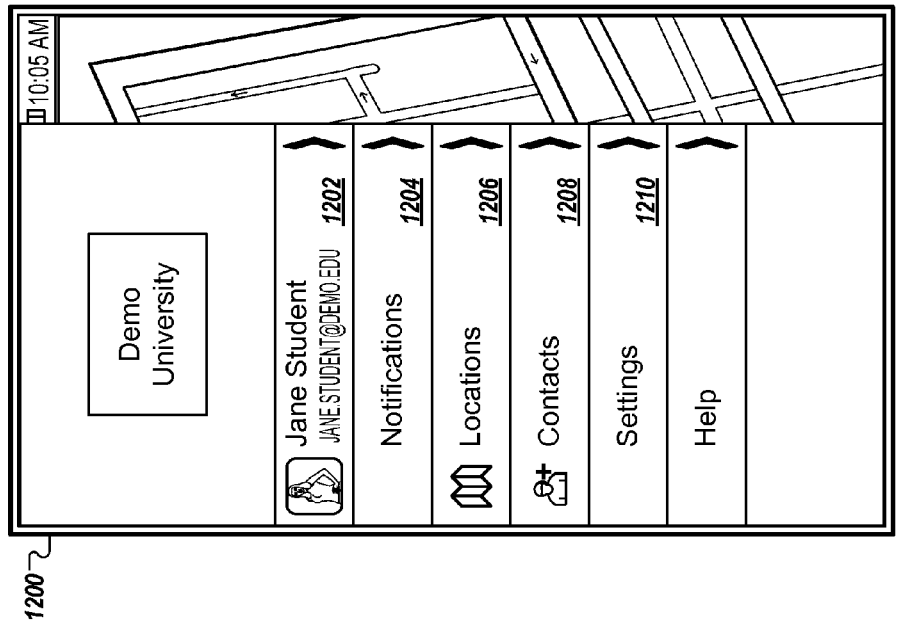

FIGS. 12-13 are example user interfaces for entering profile information for an end user account. For instance, an application, e.g., an emergency alert application, may present a user interface 1200 that allows an end user to enter their name and email address upon selection of a profile option 1202, change when and how the end user is notified by an emergency service provider system upon selection of a notifications option 1204, and enter and/or change locations associated with the end user's account upon selection of a locations option 1206. Selection of a contacts 1208 option allows the end user to identify contacts that the emergency service provider will notify when the end user is in an emergency, and may allow the end user to associate different contacts with different types of emergencies. The end user may adjust application settings, e.g., for the emergency alert application on the user device, upon selection of a settings option 1210.

For example, the user device may present a user interface 1300, shown in FIG. 13, upon receipt of selection of the settings option 1210. A launch screen on load option 1302 indicates whether the user device should immediately begin a countdown timer, e.g., shown in FIG. 9 or FIG. 15, when the setting is set to "Yes" or should present an activation user interface, e.g., shown in FIG. 8 or FIG. 14, when the setting is set to "No".

A countdown enabled option 1304 allows the end user to specify whether the application should present a countdown user interface, e.g., to provide the end user with an option to cancel the alert, or immediately send an alert to the emergency service provider system. A countdown length option 1306 allows the end user to specify the duration of the countdown timer. The application may include a default countdown length and other default values for the settings presented in the user interface 1300.

An alert type option 1308 may allow an end user to specify a default connection type between the user device and the emergency service provider system. For example, a "phone" alert type may indicate that the emergency service provider system should initiate communications by a real-time audio session, e.g., a phone call, rather than via text-based messaging.

Figure 14:
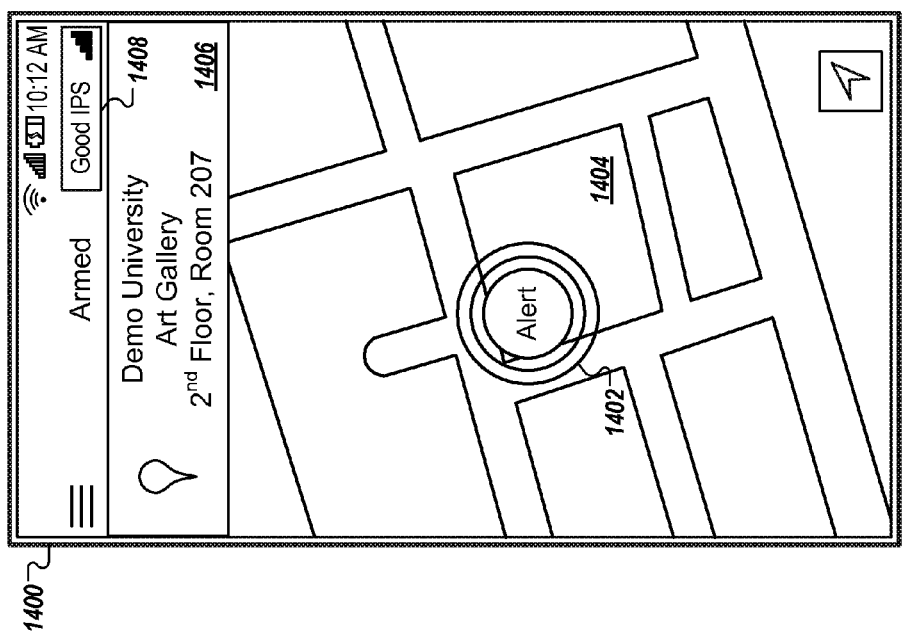
FIG. 14 is an example activation user interface that presents a location of a user device.

FIG. 14 is an example activation user interface 1400 that presents a location of a user device. The activation user interface 1400 may be presented upon launch of the emergency alert application.

Figure 15:
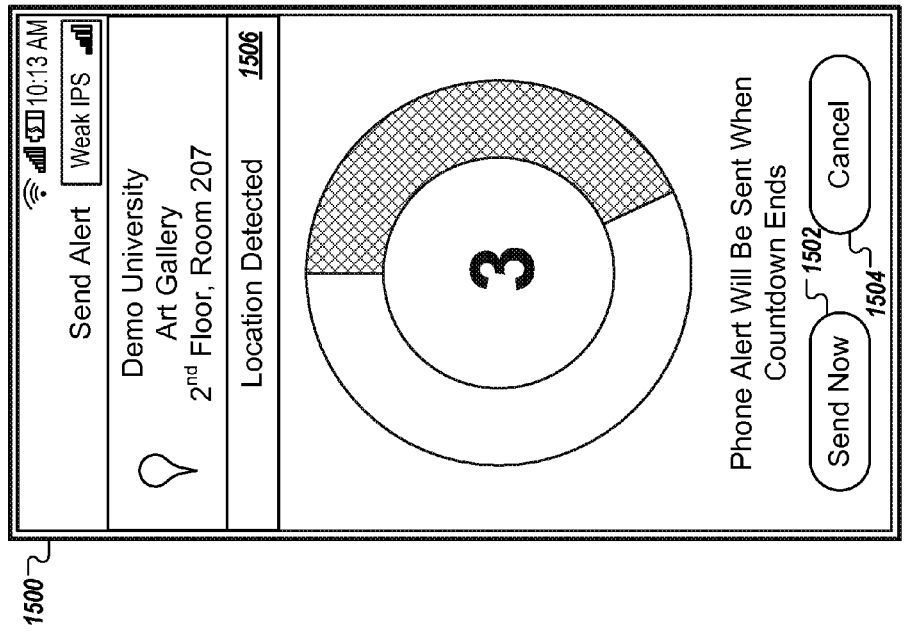
FIG. 15 is another example of a countdown user interface.
Figure 16:
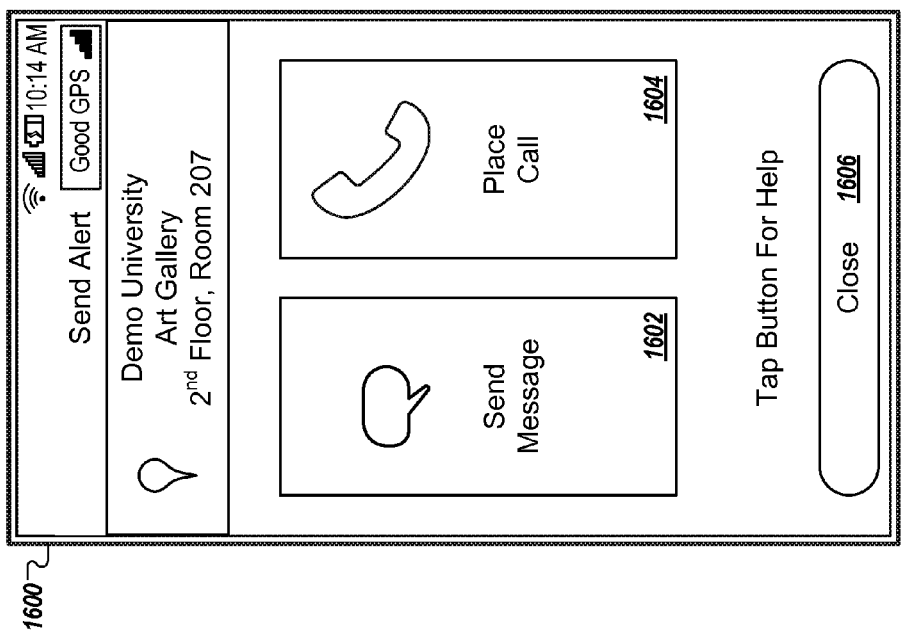

Selection of an activate alert option 1402 presents a send alert interface, e.g., shown in FIG. 16, or another user interface, e.g., shown in FIG. 15. A position of the activate alert option 1402, e.g., in a map presented in the activation user interface, may indicate a physical location of the user device, e.g., in a building 1404 or a specific room in the building 1404. For example, when the emergency alert application zooms in on the map, the map may present additional details of the building 1404, such as a hallway and other rooms in the building 1404.

The activation user interface 1400 may present physical location information 1406 that indicates the determined physical location of the user device, e.g., as determined by the user device and/or the emergency service provider system.

A signal strength field 1408 indicates the signal strength of the location signals used to determine a physical location of the user device. For example, the signal strength field may indicate that the location of the user device was determined using an indoor positioning system (IPS), GPS, cellular tower data, magnetometer data, and/or accelerometer data. The indoor positioning system may use wireless fingerprint data to determine the physical location of the user device. The signal strength field 1408 may include an identification of the strength of the signal, such as "Good," "Weak," or "No Signal." A "No Signal" identification may be specific to a particular type of signal, e.g., GPS, or may be for all types of location signals.

FIG. 15 is another example of a countdown user interface 1500. Selection of a send now option 1502 may immediately send an alert notification to the emergency service provider system. Selection of a cancel option 1504 may cancel the countdown timer and present another user interface, e.g., the activation user interface 1400.

The countdown user interface 1500, or another user interface, may present a location detected notification 1506 when a physical location of the user device is determined. For example, the user device may send location information to the emergency service provider system, the emergency service provider system may determine the physical location of the user device using the location information, and provide a message to the emergency alert application indicating that the physical location of the user device was determined. After receipt of the message, the emergency alert application may present the location detected notification 1506 on the countdown user interface 1500 for a predetermined period of time, e.g., five seconds, before removing the location detected notification 1506 from the countdown user interface 1500.

The emergency alert application may present the location detected notification 1506 multiple times on the same or different user interfaces, e.g., each time the emergency service provider system determines a change in the physical location of the user device. In some implementations, the emergency alert application presents the location detected notification 1506 when the physical location of the user device changes by a predetermined distance. For example, when the user device moves ten yards or moves from a first room into a second room, the emergency alert application may present the location detected notification 1506, e.g., upon receipt of the message from the emergency service provider system.

Figure 17:
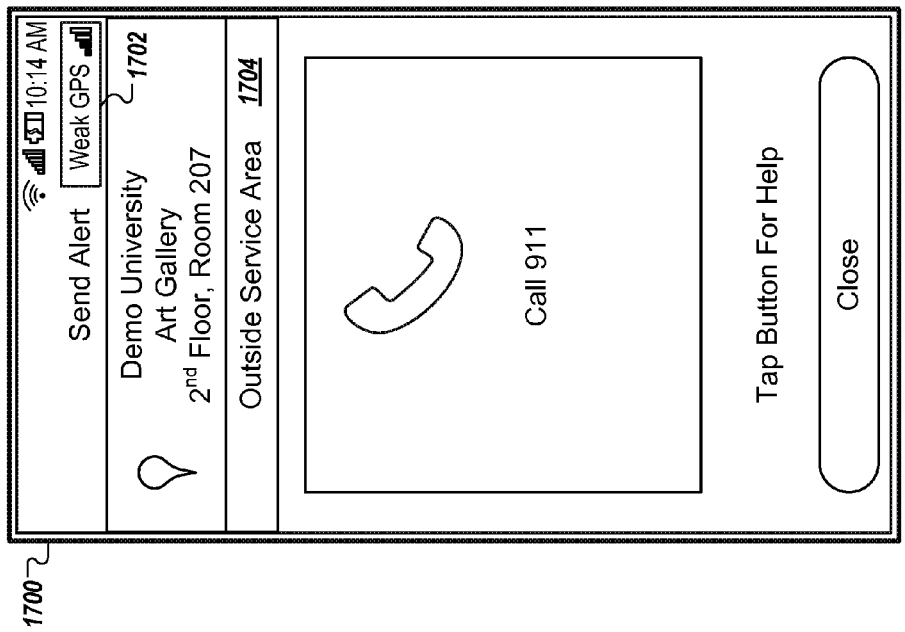
FIGS. 16-17 are other examples of user interfaces for presenting communications between the user and the emergency service provider.

FIGS. 16-17 are other examples of user interfaces for presenting communications between the user and the emergency service provider. For example, a user interface 1600 or a user interface 1700 may be presented upon expiration of the countdown timer shown in the countdown user interface 1500. The emergency alert application may present the user interface 1600 upon determining that the user device has a strong cellular signal and/or can reliably communicate via telephone and text message. The user interface 1600 includes a send message option 1602 and a place call option 1604. Upon receipt of selection of a close option 1606, the emergency alert application may end the emergency alert and present another user interface, e.g., the activation user interface 1400.

The user interface 1700, shown in FIG. 17, may be presented when the emergency alert application or the emergency service provider system determine that the user device is located in an area with a weak signal 1702, e.g., cellular signal, or when the user device is outside of an area supported by the emergency service provider.

The user interface 1700 includes an outside service area notification 1704 that may alert the end user that limited services are available to the end user. For example, the user device may only be able to place a call to a government emergency service and not initiate text message or other communications with the emergency service provider system.

In some implementations, when the user device does not detect any location information, the emergency alert application may present a message indicating that "No network is available," e.g., instead of the outside service area notification 1704, and that the user device does not have a signal that may be used for location information, e.g., "No GPS" instead of the weak signal 1702. The emergency alert application may present a message to the end user to "Make sure that GPS services are enabled" or other location based services are enabled, and may present a link to device settings of the user device to allow the end user to activate the location based services.

Figure 19:
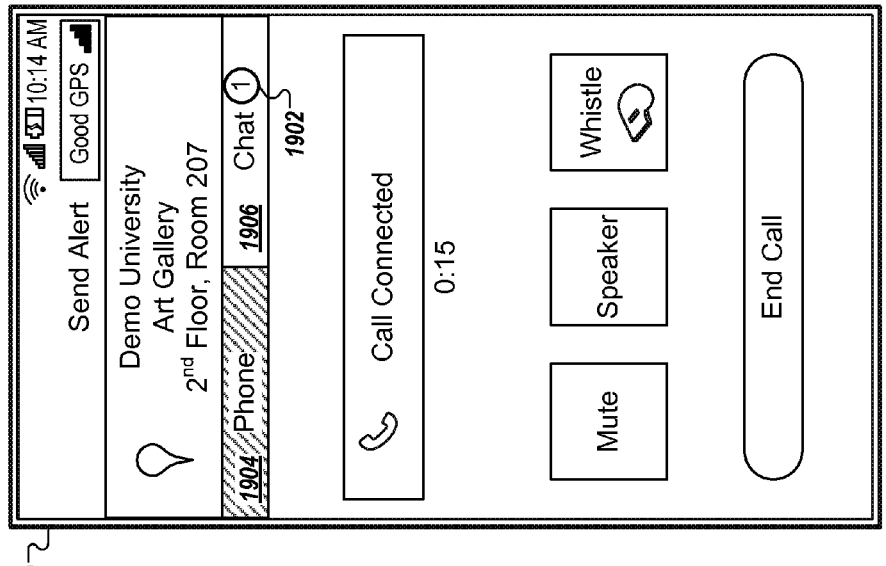
FIG. 19 is an example of a call connected user interface.
Figure 18:
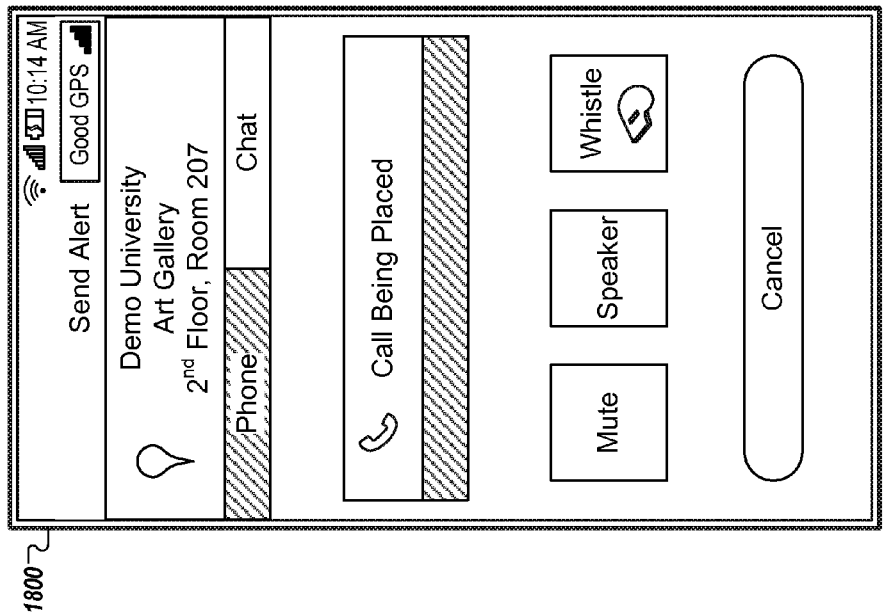
FIG. 18 is an example of a call creation user interface.

FIG. 18 is an example of a call creation user interface 1800. For example, the emergency alert application may present the call creation user interface 1800 upon receipt of selection of the place call option 1604 to indicate that the user device is calling the emergency service provider system. FIG. 19 is an example of a call connected user interface 1900. The call connected user interface 1900 may be presented upon connection of a call between the user device and the emergency service provider system, or another system, e.g., a government emergency service.

Figure 20:
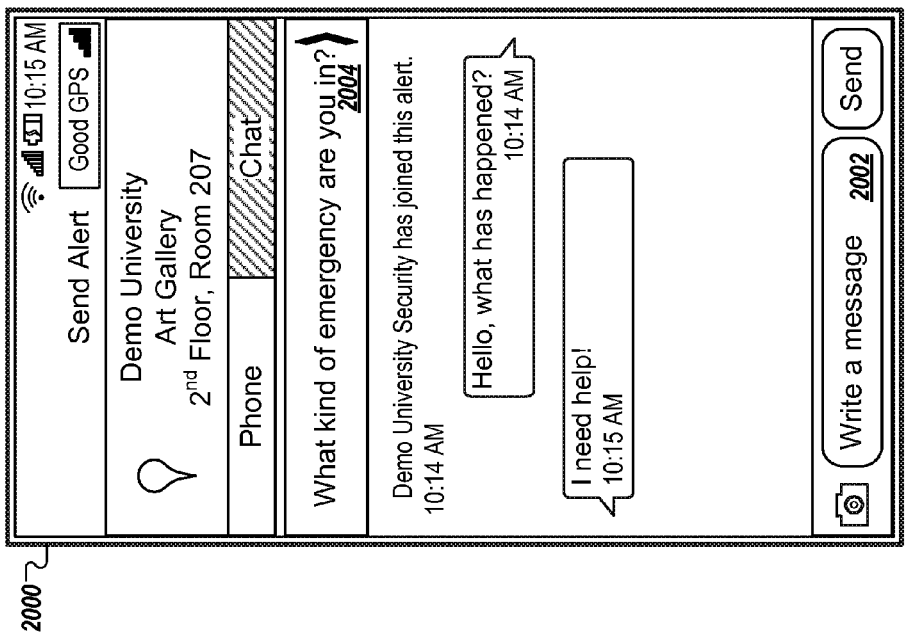
FIG. 20 is an example of a text message user interface.

The call connected user interface 1900 includes a message notification 1902. For example, the call connected user interface 1900, or another user interface, may indicate that the emergency alert application is currently presenting options for a phone call, e.g., by highlighting a phone option 1904, and that the emergency alert application received a text message from the emergency service provider system. The emergency alert application may then detect selection of a chat option 1906 and present a text message user interface 2000, shown in FIG. 20.

The text message user interface 2000 may allow the emergency alert application to communicate with the emergency service provider system via text message. For example, a message field 2002 may allow the end user to enter and send a text message or an image to the emergency service provider system.

Figure 21:
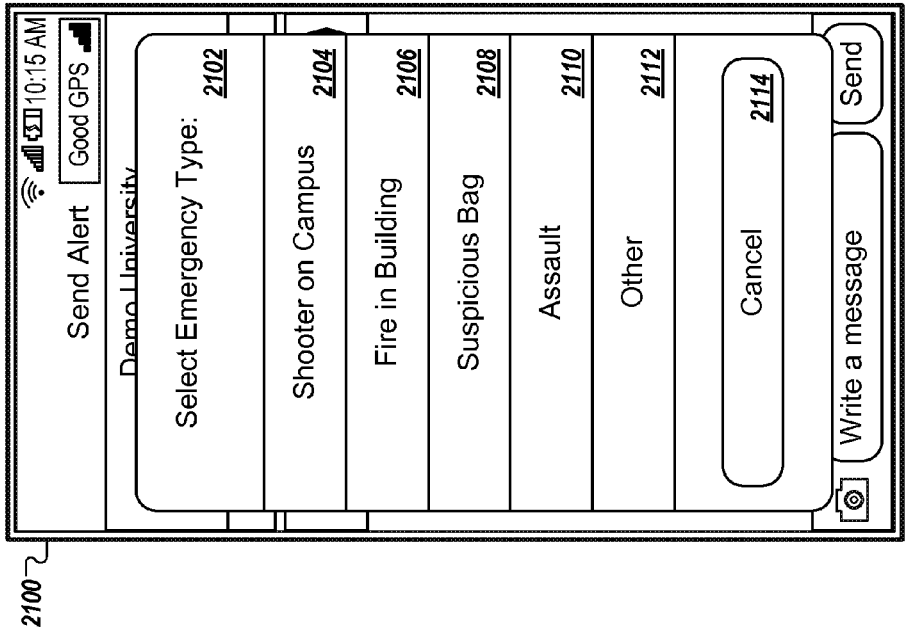
FIG. 21 is an example of an emergency type selection user interface.

The text message user interface 2000 or another user interface, e.g., the call connected user interface 1900, may include an emergency type prompt 2004. When the emergency alert application receives selection of the emergency type prompt 2004, the emergency alert application may present an emergency type selection user interface 2100, shown in FIG. 21.

An emergency type selection menu 2102 may include a shooter on campus option 2104, a fire in building option 2016, a suspicious bag option 2108, an assault option 2110, and an other option 2112. Selection of the other option 2112 may present a text entry user interface that allows the end user to specify the type of alert. Upon selection of one of the options 2104-2110, or completion of entry of text for the other option 2112, the emergency alert application sends information to the emergency service provider system indicating the type of alert the end user is experiencing.

Upon receipt of selection of a cancel option 2114, the emergency alert application may present a previous user interface, e.g., the call connected user interface 1900 or the text message user interface 2000 that initiated presentation of the emergency type selection user interface 2100. In some implementations, when the emergency alert application receives selection of the cancel option 2114, the emergency alert application cancels the alert and notifies the emergency service provider system that the alert is no longer active.

One or more of the user interfaces 1400-2100 may be presented instead of or in addition to the user interfaces 800-1000 when the user device, e.g., the emergency alert application, communicates with the emergency service provider system. For example, the emergency alert application may present the user interface 800, the countdown user interface 900, and then the user interface 1600.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory program carrier for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. The computer storage medium can be a machine-readable storage device, a machine-readable storage substrate, a random or serial access memory device, or a combination of one or more of them.

The term "data processing apparatus" refers to data processing hardware and encompasses all kinds of apparatus, devices, and machines for processing data, including by way of example a programmable processor, a computer, or multiple processors or computers. The apparatus can also be or further include special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, a module, a software module, a script, or code, can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a communication network.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Computers suitable for the execution of a computer program include, by way of example, general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube), LCD (liquid crystal display), or LED (light emitting diode) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network or Bluetooth. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, JSON document, Websocket request, or Push Notification, to a user device, e.g., for purposes of displaying data to and receiving user input from a user interacting with the user device, which acts as a client. Data generated at the user device, e.g., a result of the user interaction, can be received from the user device at the server.

Figure 22:
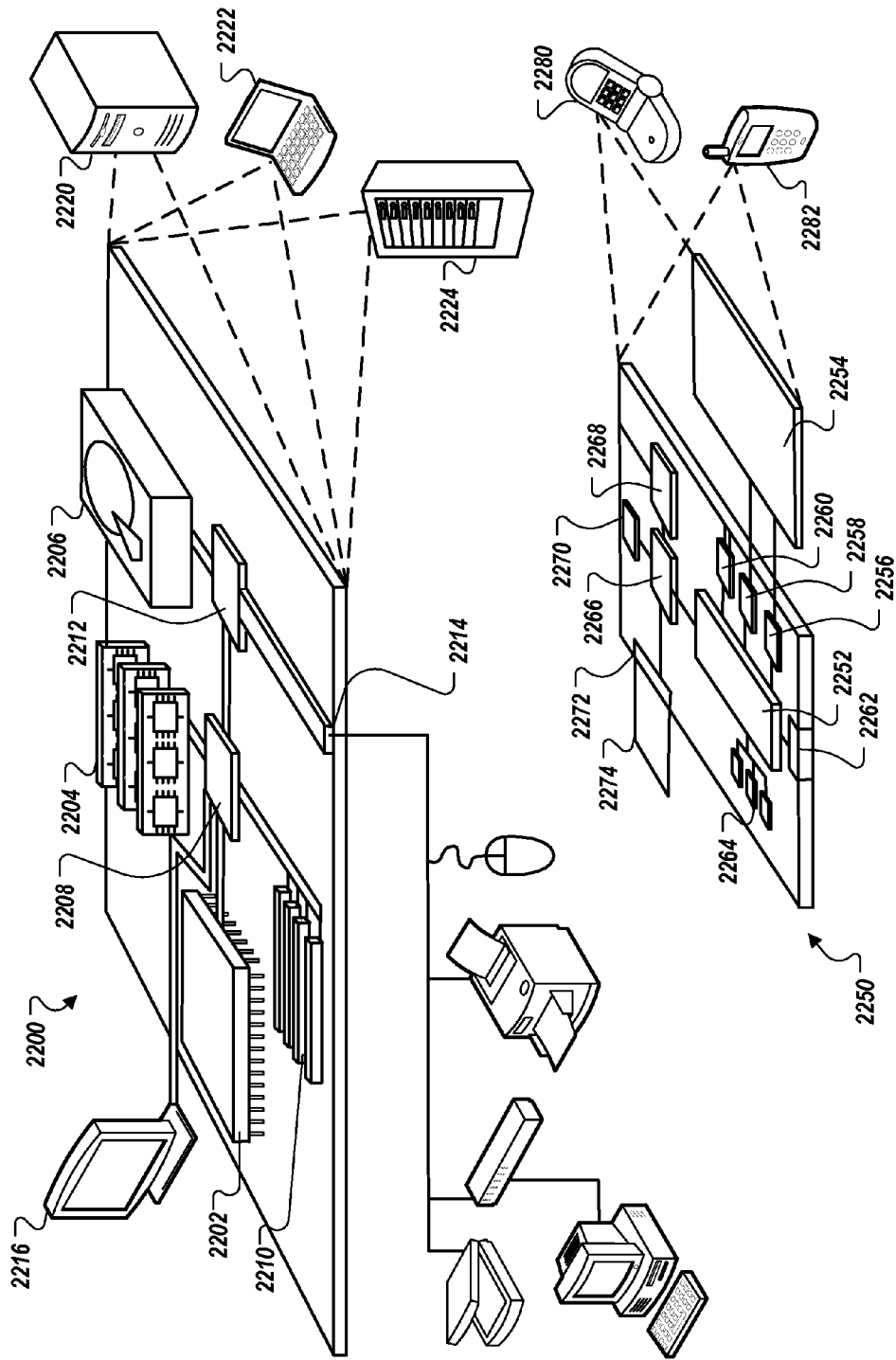
FIG. 22 is a block diagram of a computing system that can be used in connection with computer-implemented methods described in this document.

An example of one such type of computer is shown in FIG. 22, which shows a schematic diagram of a generic computer system 2200. The system 2200 can be used for the operations described in association with any of the computer-implement methods described previously, according to one implementation. The system 2200 includes a processor 2210, a memory 2220, a storage device 2230, and an input/output device 2240. Each of the components 2210, 2220, 2230, and 2240 are interconnected using a system bus 2250. The processor 2210 is capable of processing instructions for execution within the system 2200. In one implementation, the processor 2210 is a single-threaded processor. In another implementation, the processor 2210 is a multi-threaded processor. The processor 2210 is capable of processing instructions stored in the memory 2220 or on the storage device 2230 to display graphical information for a user interface on the input/output device 2240.

The memory 2220 stores information within the system 2200. In one implementation, the memory 2220 is a computer-readable medium. In one implementation, the memory 2220 is a volatile memory unit. In another implementation, the memory 2220 is a non-volatile memory unit.

The storage device 2230 is capable of providing mass storage for the system 2200. In one implementation, the storage device 2230 is a computer-readable medium. In various different implementations, the storage device 2230 may be a floppy disk device, a hard disk device, an optical disk device, or a tape device.

The input/output device 2240 provides input/output operations for the system 2200. In one implementation, the input/output device 2240 includes a keyboard and/or pointing device. In another implementation, the input/output device 2240 includes a display unit for displaying graphical user interfaces.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

In some implementations, when the emergency service provider system collects personal information about users or tracks a location of a user device operated by a user, the users may be provided with an opportunity to control what personal information is collected, how the personal information is collected, e.g., what programs or features collect user information, and/or how the personal information is used.

In some implementations, data representing personal information may be modified so that personally identifiable information is removed from the data. For example, a user's identity may be treated so that no personally identifiable information can be determined for the user or a user's physical location, e.g., based on the physical location of a corresponding user device, may be generalized if located data is stored on a server.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A method comprising:
   receiving, by a user device, selection of an alert request, the alert request specific to an emergency for a user of the user device;
   initiating, by the user device, a timer having a predetermined duration;
   automatically gathering, by the user device during the predetermined duration of the timer, two or more time-separated wireless fingerprints that can be used to determine a physical indoor location of the user device;
   automatically sending, by the user device upon expiration of the timer, a message indicating the alert request to an assistance system and comprising the two or more time-separated wireless fingerprints;
   automatically facilitating, by the user device, communication between the user of the user device and the assistance system;
   receiving, by the user device, data identifying the physical indoor location of the user device from the assistance system;
   presenting, by the user device, a location user interface including an identifier of the physical indoor location of the user device to allow the user of the user device to input updated physical indoor location data for the user device;
   automatically gathering, by the user device, additional indoor location data associated with the user device; and
   sending, by the user device, the updated physical indoor location data or the additional indoor location data to the assistance system.

2. The method of claim 1, wherein facilitating, by the user device, communication between the user of the user device and the assistance system comprises:
   presenting, by the user device, a real-time text message interface;
   receiving, by the user device, input from the user of the user device and representing communications from the user to an operator of the assistance system;
   sending text messages to the assistance system using the input from the user; and
   receiving text messages from the assistance system representing communications from the assistance system to the user of the user device.

3. The method of claim 1, comprising:
   presenting, by the user device, a countdown user interface depicting a cancel option to cancel the timer and not send the alert request, a send now option to send the alert request upon receipt of a selection of the send now option, and a current duration of the timer, the countdown user interface presented after selection of the alert request and prior to automatically sending the message indicating the alert request to the assistance system.

4. A method comprising:
   receiving, by an assistance system, a message from a user device, the message comprising an alert request and physical indoor location data for the user device, the alert request specific to an emergency for a user of the user device;
   determining, by the assistance system, a physical indoor location of the user device using the physical indoor location data;
   presenting, by the assistance system, an operator user interface to an operator, wherein the operator user interface facilitates communication between the assistance system and the user device and comprises a map that includes an identifier representing the physical indoor location of the user device and a display of past alerts for a region that includes the physical indoor location or a geographical area that is similar to the physical indoor location;
   providing, by the assistance system, the physical indoor location of the user device to the user device for presentation in a location user interface that includes an identifier for the physical indoor location of the user device;

receiving, by the assistance system from the user device, an updated physical indoor location of the user device determined using input from the user of the user device or additional indoor location data automatically gathered by the user device; and updating, by the assistance system, the map using the updated physical indoor location of the user device or the additional indoor location data.

5. The method of claim 4, comprising:

authenticating, by the assistance system, a user account assigned to the user device and corresponding with the user of the user device;

determining, by the assistance system and after authenticating the user device, one or more contacts identified in the user account to notify upon occurrence of the alert request; and notifying, by the assistance system, the contacts.

6. The method of claim 4, comprising:

determining, by the assistance system, hardware components installed in physical locations proximate to the physical indoor location of the user device;

presenting, by the assistance system, one or more user interface elements for each of the hardware components; and controlling, by the assistance system, the hardware components upon receipt of a selection of a corresponding user interface element.

7. The method of claim 6, wherein presenting, by the assistance system, the user interface elements for each of the hardware components comprises presenting the user interface elements in the operator user interface.

8. The method of claim 6, wherein presenting, by the assistance system, the user interface elements for each of the hardware components comprises presenting the user interface elements on a second user device operated by an emergency personnel.

9. The method of claim 6, wherein:

the hardware components comprise a door proximate to the physical indoor location of the user device; and presenting, by the assistance system, the user interface elements for each of the hardware components comprises presenting, by an access control component, an unlock door option that unlocks the door.

10. The method of claim 6, wherein:

the hardware components comprise a fire sprinkler proximate to the physical indoor location of the user device; and presenting, by the assistance system, the user interface elements for each of the hardware components comprises presenting, by a fire system component, an open valve option that opens the fire sprinkler.

11. The method of claim 6, wherein:

the hardware components comprise a video camera proximate to the physical indoor location of the user device; and presenting, by the assistance system, the user interface elements for each of the hardware components comprises:

receiving, by a video camera component and from the video camera, a video stream of a physical area proximate to the user device; and presenting, by the video camera component, the video stream in the operator user interface.

12. The method of claim 4, comprising:

providing, by the assistance system, one or more emergency personnel other than the operator with the determined physical indoor location of the user device.

13. The method of claim 4, comprising:

facilitating, by the assistance system, communication between the assistance system and the user device using the operator user interface.

14. The method of claim 13, wherein facilitating, by the assistance system, communication between the assistance system and the user device comprises sending text messages to and receiving text messages from the user device.

15. The method of claim 13, wherein facilitating, by the assistance system, communication between the assistance system and the user device comprises initiating a telephone call between the user device and the assistance system and presenting a user interface for the telephone call in the operator user interface.

16. A computer storage medium encoded with instructions that, when executed by a computer, cause the computer to perform operations comprising:

receiving, by an assistance system, a message from a user device, the message comprising physical indoor location data for the user device and a request to monitor the user device indicating that a user operating the user device is not currently in an emergency situation but an operator of the assistance system should monitor the user for a potential emergency situation;

determining, by the assistance system, a physical indoor location of the user device using the physical indoor location data;

determining, by the assistance system, one or more cameras that capture images of an area that includes the physical indoor location of the user device using the physical indoor location;

presenting, by the assistance system, an operator user interface to the operator, wherein the operator user interface comprises an image or a video stream from at least one of the cameras, a map that includes an identifier representing the physical indoor location of the user device, and a display of past alerts for the user operating the user device;

providing, by the assistance system, the physical indoor location of the user device to the user device for presentation in a location user interface that includes an identifier for the physical indoor location of the user device;

receiving, by the assistance system from the user device, an updated physical indoor location of the user device determined using input from the user of the user device or additional indoor location data automatically gathered by the user device; and updating, by the assistance system, the map using the updated physical indoor location of the user device or the additional indoor location data.

17. The computer storage medium of claim 16, the operations comprising:

receiving, by the assistance system, an alert request different from the request to monitor the user device; and facilitating, by the assistance system, communication between the assistance system and the user device using the operator user interface.

18. The computer storage medium of claim 17, wherein receiving the alert request comprises receiving the alert request from the user device.

19. The computer storage medium of claim 17, wherein receiving the alert request comprises receiving input from the operator indicating that the user operating the user device is in an emergency situation.

20. The computer storage medium of claim 19, the operations comprising:

presenting, in the operator user interface, a list including an identifier for each of multiple user devices from which the assistance system has received a request to monitor the corresponding user device, each of the user devices operated by a different user.

21. A system comprising:
a user device and one or more storage devices storing instructions that are operable, when executed by the user device, to cause the user device to perform operations comprising:
  receiving, by the user device, selection of an alert request, the alert request specific to an emergency for a user of the user device;
  initiating, by the user device, a timer having a predetermined duration;
  automatically gathering, by the user device during the predetermined duration of the timer, two or more time-separated wireless fingerprints that can be used to determine a physical indoor location of the user device;
  automatically sending, by the user device upon expiration of the timer, a message indicating the alert request to an assistance system and comprising the two or more time-separated wireless fingerprints;
  automatically facilitating, by the user device, communication between the user of the user device and the assistance system;
  receiving, by the user device, data identifying the physical indoor location of the user device from the assistance system;
  presenting, by the user device, a location user interface including an identifier of the physical indoor location of the user device to allow the user of the user device to input updated physical indoor location data for the user device;
  automatically gathering, by the user device, additional indoor location data associated with the user device; and
  sending, by the user device, the updated physical indoor location data or the additional indoor location data to the assistance system.

22. The method of claim 2, comprising:
presenting, by the user device, an emergency type prompt that allows the user of the user device to identify a type of emergency for the alert request.

23. The method of claim 1, wherein facilitating, by the user device, communication between the user of the user device and the assistance system comprises:

determining, by the user device, a type of emergency for the alert request;
determining, by the user device, a preferred communication type for the type of emergency; and
sending text messages to and receiving text messages from the assistance system based on determining that the preferred communication type for the type of emergency is text based communications.

24. The method of claim 4, comprising:
receiving, by the assistance system, updated physical indoor location data for the user device;
determining, by the assistance system, an updated physical indoor location of the user device using the updated physical indoor location data; and
changing, by the assistance system in the operator user interface, a location of the identifier on the map to represent the updated physical indoor location of the user device.

25. The method of claim 4, wherein the alert request is for a particular emergency type, the method comprising:
receiving, by the assistance system, a plurality of other messages each of which is from another corresponding user device and comprising another alert request and other physical indoor location data for the corresponding other user device, each of the other alert requests specific to another emergency for another respective user of the corresponding other user device and having a specific emergency type;
determining, by the assistance system, that the specific emergency type for each of the other alert requests and the particular emergency type for the alert request are the same;
determining, by the assistance system, a physical indoor location of each of the other user devices using the corresponding other physical indoor location data; and
presenting, by the assistance system in the operator user interface, another identifier in the map, for each of the other alert requests, representing the corresponding physical indoor location of each of the respective other user devices in response to that the specific emergency type for each of the other alert requests and the particular emergency type for the alert request are the same, wherein the operator user interface facilitates communication between the assistance system and each of the other user devices.

* * * * *